(12) United States Patent
Pearce et al.

(10) Patent No.: US 8,072,438 B2
(45) Date of Patent: Dec. 6, 2011

(54) GESTURE RECOGNITION

(75) Inventors: Nigel Pearce, Keighley (GB); Peter Unsworth, Slaidburn (GB)

(73) Assignee: Promethean Limited, Blackburn (GB)

( * ) Notice: Subject to any disclaimer, the term of this patent is extended or adjusted under 35 U.S.C. 154(b) by 0 days.

(21) Appl. No.: 12/845,613

(22) Filed: Jul. 28, 2010

(65) Prior Publication Data
US 2010/0295779 A1 Nov. 25, 2010

Related U.S. Application Data

(63) Continuation of application No. 12/445,107, filed as application No. PCT/GB2007/003855 on Oct. 10, 2007.

(30) Foreign Application Priority Data

Oct. 10, 2006 (GB) .............................. 20060020047

(51) Int. Cl.
*G06F 3/041* (2006.01)
(52) U.S. Cl. ....................................... 345/173; 345/179
(58) Field of Classification Search .................. 345/156, 345/173–175, 179; 178/18.01–18.07, 19.01–19.05
See application file for complete search history.

(56) References Cited

U.S. PATENT DOCUMENTS

| 5,402,151 | A | | 3/1995 | Duwaer | |
|---|---|---|---|---|---|
| 5,442,788 | A | | 8/1995 | Bier | |
| 5,509,114 | A | * | 4/1996 | Moran et al. | 345/443 |
| 5,716,520 | A | | 2/1998 | Mason | |
| 5,745,116 | A | * | 4/1998 | Pisutha-Arnond | 715/863 |
| 6,029,214 | A | | 2/2000 | Dorfman et al. | |
| 6,088,023 | A | | 7/2000 | Louis et al. | |
| 6,256,033 | B1 | * | 7/2001 | Nguyen | 715/863 |
| 6,323,846 | B1 | * | 11/2001 | Westerman et al. | 345/173 |
| 2002/0015064 | A1 | * | 2/2002 | Robotham et al. | 345/863 |
| 2002/0085030 | A1 | | 7/2002 | Ghani | |
| 2004/0075695 | A1 | | 4/2004 | Chew et al. | |
| 2004/0075820 | A1 | | 4/2004 | Chu et al. | |
| 2004/0178997 | A1 | * | 9/2004 | Gillespie et al. | 345/173 |
| 2004/0189587 | A1 | | 9/2004 | Jung et al. | |
| 2005/0078092 | A1 | | 4/2005 | Clapper | |
| 2005/0183029 | A1 | | 8/2005 | Barabe et al. | |
| 2006/0001650 | A1 | | 1/2006 | Robbins et al. | |
| 2006/0026521 | A1 | | 2/2006 | Hotelling et al. | |

(Continued)

FOREIGN PATENT DOCUMENTS

EP 0572031 A1 1/1993

(Continued)

OTHER PUBLICATIONS

BECTA ICT Advice, "Getting the Most from Your Interactive Whiteboard," Becta 2004, British Educational Communications and Technology Agency (Becta) 01/2003-04/307/a/NP/10k, retrieved from http://www.becta.org.uk/corporate/publications/documents/whiteboard_pri_.pdf; Aug. 9, 2010.

(Continued)

*Primary Examiner* — Ricardo L Osorio
(74) *Attorney, Agent, or Firm* — Marsh Fischmann & Breyfogle LLP; Kent A. Lembke

(57) ABSTRACT

There is disclosed an interactive display system comprising an interactive surface for displaying an image and for receiving inputs from remote devices, the system being adapted to detect the presence of at least two remote devices proximate the interactive surface.

20 Claims, 14 Drawing Sheets

U.S. PATENT DOCUMENTS

2008/0036773 A1* 2/2008 Bae .................. 345/442

FOREIGN PATENT DOCUMENTS

| EP | 0645726 | A2 | 9/1993 |
|---|---|---|---|
| EP | 0572031 | A1 | 12/1993 |
| EP | 0595065 | A1 | 5/1994 |
| EP | 0602913 | A2 | 6/1994 |
| EP | 0736838 | A1 | 10/1996 |
| EP | 0915429 | A3 | 4/2000 |
| JP | 2001063193 | A1 | 3/2001 |
| JP | 2004234661 | A1 | 8/2004 |
| WO | 9711449 | | 3/1997 |
| WO | 0126090 | A1 | 4/2001 |
| WO | 0175568 | A1 | 10/2001 |
| WO | 03032278 | A1 | 4/2003 |
| WO | 03041033 | A1 | 5/2003 |
| WO | 2005124526 | A2 | 12/2005 |
| WO | 2005124626 | A2 | 12/2005 |
| WO | 2006127466 | A2 | 11/2006 |

OTHER PUBLICATIONS

Shen, Chia, et a. "DiamondSpin: An Extensible Toolkit for Around-the-Table Interaction," CHI 2004, Apr. 24-29, 2004, Vienna, Austria. ACM 1-58113-702-8/04/0004.

Dietz, Paul, et al., "DiamondTouch: A multi-User Touch Technology," Mitsubishi Electric Research Laboratories, Oct. 2003, TR2003-125, Published in Proceedings of UIST 2001, the 14th Annual ACM Symposium on User Interface Software and Technology, November 11-14-201, Orlando, Florida, p. 219-226.

Search Report under Section 17; Application No. GB1007190.0, date of Search Report Aug. 18, 2010.

Becta ICT Advice (British Educational Communications and Technology Agency), "Getting the most from your Interactive Whiteboard" A guide for secondary schools, Dated 2004, available from http://www.becta.org.uk/corporate/publications/documents/whiteboard_pri_.pdf.

Corrected Search Report under Section 17, Application No. GB0620047.1, Dated Dec. 22, 2006.

Search Report under Section 17, Application No. GB0821375.3, Dated Dec. 11, 2008.

Corrected Search Report under Section 17, Application No. GB0821377.9, Dated Dec. 18, 2008.

Search Report under Section 17, Application No. GB0822419.8, Dated Dec. 23, 2008.

Search Report under Section 17, Application No. GB0821374.6, Dated Dec. 30, 2008.

Search Report under Section 17, Application No. GB0821376.1, Dated Feb. 7, 2009.

Search Report under Section 17, Application No. GB0905467.7, Dated May 8, 2009.

International Search Report, PCT/GB2007/003855, dated May 28, 2008.

Combined Search and Examination Report under Sections 17 and 18(3), Application No. GB0917764.3, dated Feb. 10, 2010, three pages, IP office United Kingdom.

* cited by examiner

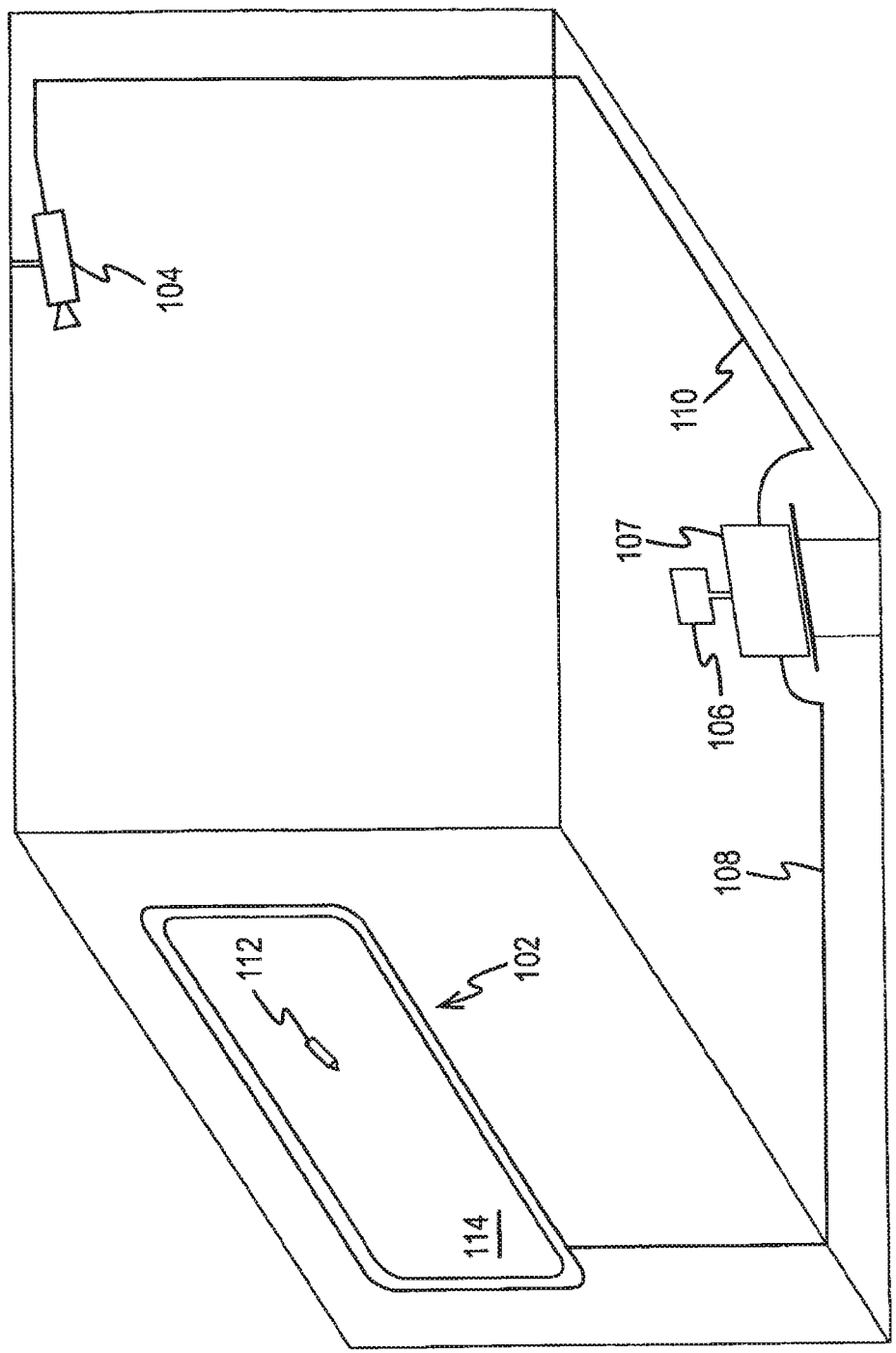

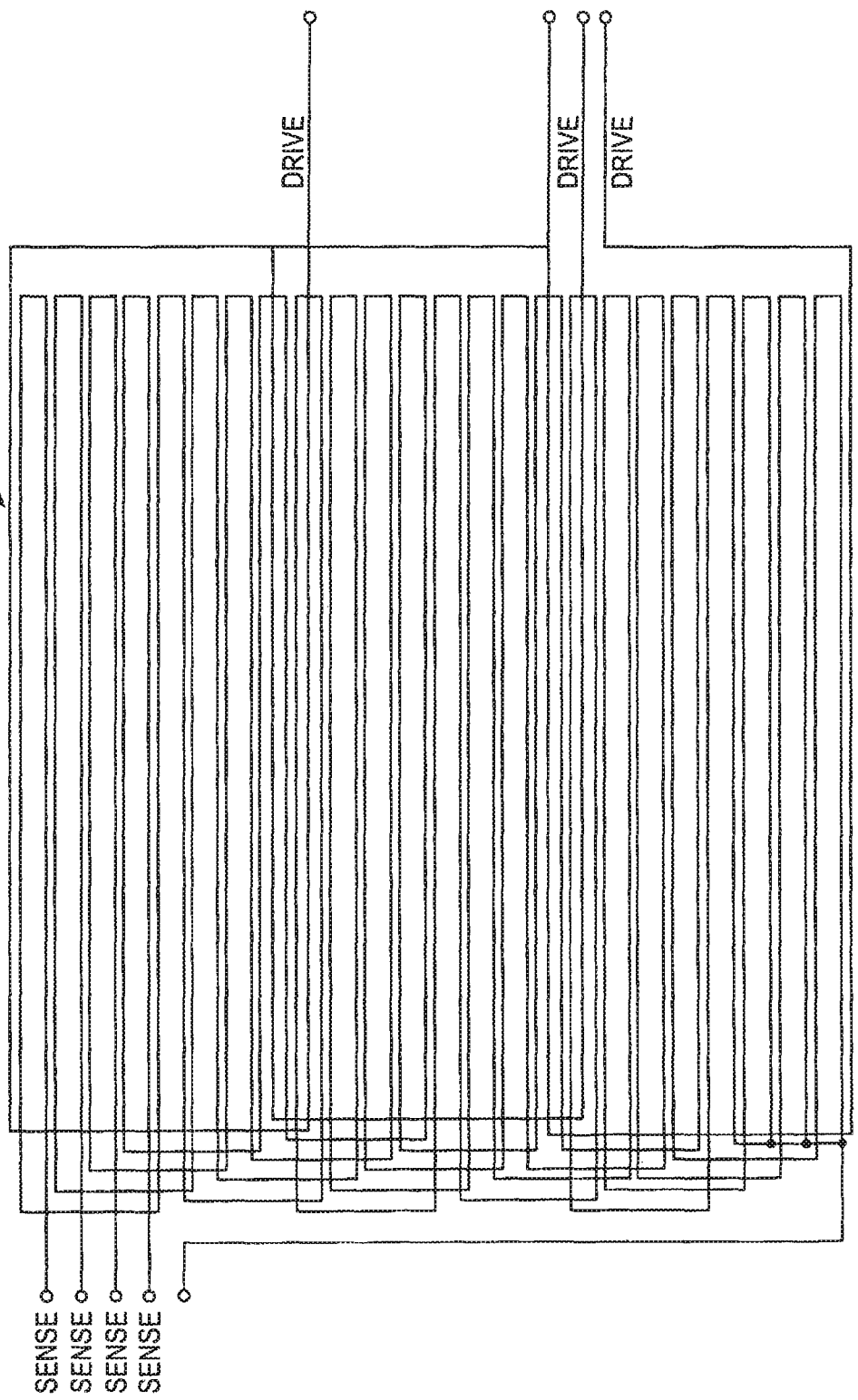

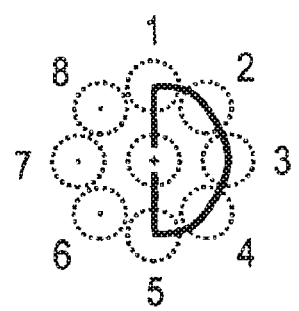
(a)
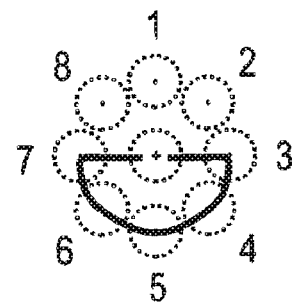
(b)
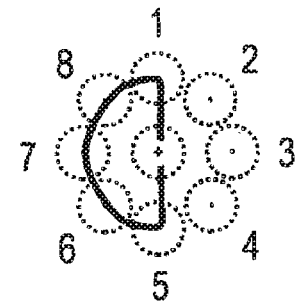
(c)
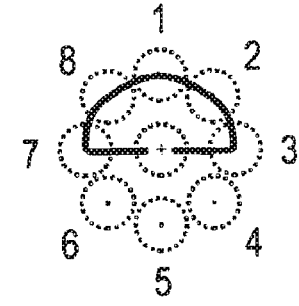
(d)
FIG. 14
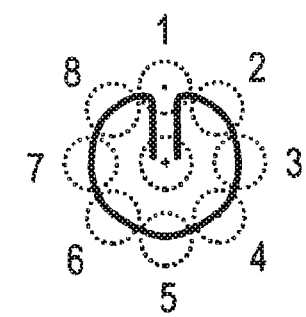
FIG. 15

GESTURE RECOGNITION

RELATED APPLICATIONS

This application is a continuation of U.S. patent application Ser. No. 12/445,107, filed Apr. 14, 2010, entitled, "INTERACTIVE DISPLAY SYSTEM," which is a national phase of PCT Application No. PCT/GB2007/003855, filed Oct. 20, 2007, entitled, "INTERACTIVE DISPLAY SYSTEM," which claims priority from GB Patent Application No. GB20060020047, filed on Oct. 10, 2006, which are hereby incorporated by reference into this application.

The invention relates to interactive display systems.

A typical example of an interactive display system is an electronic whiteboard system. An electronic whiteboard system typically is adapted to sense the position of a pointing device or pointer relative to a working surface of the whiteboard, the working surface being an interactive surface. When an image is displayed on the work surface of the whiteboard, and its position calibrated, the pointer can be used in the same way as a computer mouse to manipulate objects on the display by passing the pointer over the surface of the whiteboard.

A typical application of an interactive whiteboard system is in a teaching environment. The use of interactive whiteboards improves teaching productivity and also improves student comprehension. Such whiteboards also allow use to be made of good quality digital teaching materials, and allow data to be manipulated and presented using audio visual technologies.

A typical construction of an electronic whiteboard comprises providing an array or matrix of drive and sense coils behind or underneath the working surface of the whiteboard to thereby form an interactive surface, which coils interact with electromagnetic elements in the pointer device.

An electronic whiteboard system may also be associated with interactive tablets or graphic tablets which may be used by users of the system. Such graphic tablets may be constructed in a similar way—but on a smaller scale—to an electronic whiteboard. A grid array may be provided in conjunction with a working surface to form an interactive surface, and a user may work on such surface with a pointing device adapted to interact with the interactive surface.

It should also be noted that graphic tablets may be used independently of a whiteboard system. For example they are known to be used as input devices for computer systems, where a graphic tablet may replace a 'mouse and mat' arrangement.

In current whiteboard system arrangements, and in arrangements of graphic tablets for computer input use, the pointing device is typically provided as a pen-style device. It has been typically considered that a pen-style device is a natural choice for use with an interactive surface since it mimics the action of pen-on-paper that most users are familiar with.

Typically such a pen may be provided with buttons which function in the same way as the buttons of a computer mouse. In one arrangement, the depression of a button is achieved by pressing the pen in an axial direction toward the interactive surface.

In typical existing electronic whiteboard systems, the use of two pointing devices on the interactive surface simultaneously is not possible. Generally two pointing devices would interfere with each other. For example where the pointing devices is used as a 'mouse substitute', moving a cursor around the display, the presence of two pointers on the interactive surface would cause the cursor to rapidly fluctuate between the points of contact of the two pointing devices.

It is an aim of the invention to provide an improved interactive, system.

The invention provides an interactive display system comprising an interactive surface for displaying an image and for receiving inputs from remote devices, the system being adapted to detect the presence of at least two remote devices proximate the interactive surface.

The system is preferably adapted to receive data in dependence on the detection of the presence of either of the at least two remote devices. The system is preferably adapted to detect the presence of the at least two remote devices proximate the interactive surface simultaneously.

The system is preferably adapted to receive data from both of the at least two remote devices in the presence of the at least two remote devices proximate the interactive surface simultaneously.

An allocated functionality enables a remote device to annotate a displayed image. A plurality of remote devices may adapt a displayed image.

An allocated functionality may enable the remote device to control a graphical user interface on the displayed image.

Preferably one of the at least two remote devices controls the other remote device. The one of the at least two remote devices may enable and disable the other remote device.

A functionality of the system may be provided in dependence upon simultaneous data received from at least two remote devices. The simultaneous data received from at least two remote devices simultaneously may control an application running on the interactive system. The functionality of the system may be dependent upon the detection of movement of at least one of the remote devices. The functionality of the system may be dependent upon the detection of a direction of movement of at least one of the remote devices.

An icon displayed on the screen and dragged toward the edge of the screen may be displayed on the opposite side of the screen.

The interactive surface may be divided into at least two active areas, each remote device being associated with one active area, wherein an icon allocated for use by one user and displayed in one active area dragged towards the edge of the one active area by the one user is then displayed in the other active area and allocated for use by the other user.

An icon on the displayed image may be moved by selecting the icon by placing a remote device proximate the interactive surface at a position where the icon is displayed, and moving the pointer proximate the surface in a given direction, wherein responsive thereto the icon is displayed in a different position of the interactive display other than the position where the remote device is located.

The icon may be displayed in the different position in dependence upon the distance and/or speed the remote device is moved.

A plurality of active regions may be defined on the interactive surface, the icon being displayed on the image in an active region in which the pointer is currently being used.

The invention provides an interactive system comprising an interactive surface for displaying an image and for receiving inputs from a plurality of remote devices, the interactive surface defining at least two active areas, each active area being associated with at least one remote device.

Data from a remote device may be processed only when the remote device is detected in an active area with which it is associated.

Multiple active areas may be defined within an application. Multiple active areas may be defined within a work surface of an application.

The invention provides an interactive system comprising an interactive surface for displaying an image and for receiving inputs from a plurality of remote devices, the system being adapted to manipulate an image displayed on the interactive surface in dependence on data received from the plurality of remote devices.

The system may be adapted to manipulate the image responsive to detection of movement of one of the remote devices. The system may be adapted to manipulate an image responsive to detection of the plurality of remote devices selecting the image.

The image may be rotated responsive to detection of a first remote device positioned on the displayed image and stationary, and detection of a second remote device positioned on the displayed image and moving, the rotation being about an axis defined by the position of the first remote device.

The image may be rotated responsive to detection of a first remote device positioned on the displayed image, and detection of a second remote device positioned on the displayed image, the rotation being determined in dependence on detected movement of either the first or second remote devices.

The image may be resized responsive to detection of a first remote device positioned on the displayed image and stationary, and detection of a second remote device positioned on the displayed image and moving, the image size being decreased responsive to the distance between the first and second remote devices decreasing and the image size being increased responsive to the distance between the first and second devices increasing.

The image may be resized responsive to detection of a first remote device positioned on the displayed image, and detection of a second remote device positioned on the displayed image, the image size being decreased responsive to the distance between the first and second remote devices decreasing and the image size being increased responsive to the distance between the first and second devices increasing.

The image may be stretched responsive to detection of a first remote device positioned on the displayed image and stationary, and detection of a second remote device positioned on the displayed image and moving, the image size being stretched responsive to the distance between the first and second remote devices increasing.

The image may be compressed responsive to detection of a first remote device positioned on the displayed image and stationary, and detection of a second remote device positioned on the displayed image and moving, the image size being compressed responsive to the distance between the first and second remote devices decreasing.

The image may be resized responsive to detection of a first remote device positioned on the displayed image, and detection of a second remote device positioned on the displayed image, the image size being compressed responsive to the distance between the first and second remote devices decreasing and the image size being stretched responsive to the distance between the first and second devices increasing.

The image may be moved responsive to detection of a first remote device positioned on the displayed image, and detection of a second remote device positioned on the displayed image, the movement being determined in dependence on detected movement of either the first or second remote devices.

The image may be separated responsive to detection of a first remote device positioned on the displayed image, and detection of a second remote device positioned on the displayed image, the separation being determined in dependence on detected movement of either the first or second remote devices. The image may be separated at a point midway between the detected starting positions of the two remote devices.

Separate images may be joined responsive to detection of a first remote device positioned on a first displayed image, and detection of a second remote device positioned on a second displayed image, the joining being determined in dependence on detected movement of either or both of the first or second images such that the images are positioned within a predetermined distance of each other. Said joining may create a single image or a connection between the two images.

The image may be duplicated responsive to detection of a first remote device positioned on the displayed image, and detection of a second remote device positioned on the displayed image, the duplication being determined in dependence on a detected dragging movement of either the first or second remote devices and providing a duplicate image at a location to which the dragged remote device is positioned.

The image may be cropped responsive to detection of a first remote device positioned on the displayed image, and detection of a second remote device positioned on the displayed image, the two detected positions defining opposite corners of a cropping rectangle the size of which is adjusted in dependence on movement of either or both of the remote devices to define a cropping area for the image.

A distance may be measured responsive to detection of a first remote device positioned on the interactive display, and detection of a second remote device positioned on the interactive display, the detected positions being used to determine the distance between the two remote devices.

The invention provides an interactive system comprising an interactive surface for displaying an image and for receiving inputs from at least one remote device, the system being adapted to manipulate an image displayed on the interactive surface in dependence on data received from the remote device, wherein responsive to detection of the remote device selecting an image and dragging it toward the edge of the interactive surface, the image is displayed on the opposite edge of the interactive surface.

There may be provided a plurality of remote devices, each remote device being associated with one or more active areas, wherein responsive to an image displayed in one active area and associated with one remote device being dragged by that remote device to the edge of that active area, the image is displayed in another active area and re-associated with another remote device associated with that active area.

The invention provides an interactive system comprising an interactive surface for displaying an image and for receiving inputs from at least one remote device, a displayed image being associated with a remote device, wherein the position of the displayed image on the interactive surface is dependent upon a current position of the associated remote device on the interactive surface.

The invention provides an interactive system comprising an interactive surface for displaying an image and for receiving inputs from at least one remote device, the system being adapted to detect a predetermined sequence of movements of the remote device, and responsive thereto an operation is enabled.

The predetermined sequence of movements may correspond to a user gesture. The predetermined sequence of movements is detected between a set of points.

The invention provides a method in an interactive display system comprising an interactive surface for displaying an image and for receiving inputs from remote devices, the method comprising detecting the presence of at least two remote devices proximate the interactive surface.

The method may comprise the step of allocating a functionality to each of the at least two remote devices. The step may allocate each remote device at least one different functionality. The step may allocate each remote device at least one common functionality.

The method may comprise the step of, when a remote device is detected in an active region of the interactive surface not defined for that remote device, not processing any data from that remote device.

The method may define a physical area as an active region of the interactive surface. The method may define an icon on the displayed image or a graphical user interface on the displayed image as an active region of the interactive surface.

The method may comprise the step of dividing the interactive surface into at least two active areas, each remote device being associated with one active area, wherein an icon allocated for use by one user and displayed in one active area dragged towards the edge of the one active area by the one user is then displayed in the other active area and allocated for use by the other user.

Responsive to the step of an icon being moved toward the edge of one active area, there may be displayed the icon on the opposite side of another active area.

The method may comprise the step of moving an icon on the displayed image by selecting the icon by placing a remote device proximate the interactive surface at a position where the icon is displayed, and moving the pointer proximate the surface in a given direction, wherein responsive thereto the icon is displayed in a different position of the interactive display other than the position where the remote device is located.

The method may comprise the step of moving the displayed icon to an edge of the displayed image corresponding to the direction of movement of the remote device.

The method may comprise the step of displaying the icon in the different position in dependence upon the distance the remote device is moved.

The method may comprise displaying the icon in the different position in dependence upon the speed with which the remote device is moved.

The method may display the position of an icon in the image in dependence upon a current detected location of a remote device for which the icon is an active icon.

The method may comprise the step of displaying the icon at an edge of the image nearest to the current detected location of the remote device.

The method may comprise the step of defining a plurality of active regions on the interactive surface, the icon being displayed on the image in an active region in which the pointer is currently being used.

The invention provides a method in an interactive system including an interactive surface for displaying an image and for receiving inputs from a plurality of remote devices, the method comprising defining at least two active areas of the interactive surface, each active area being associated with at least one remote device.

The method may process data from a remote device only when the remote device is detected in an active area with which it is associated.

The active area may be a physical area of the interactive surface. The active area may be an icon or graphical user interface displayed on the interactive surface. The method may define multiple active areas within an application or multiple active areas within a work surface of an application.

The invention provides a method in an interactive system comprising an interactive surface for displaying an image and for receiving inputs from a plurality of remote devices, comprising the step of manipulating an image displayed on the interactive, surface in dependence on data received from the plurality of remote devices.

The method may comprise the step of manipulating the image responsive to detection of movement of one of the remote devices. The method may comprise manipulating an image responsive to detection of the plurality of remote devices selecting the image.

A distance may be measured responsive to detection of a first remote device positioned on the interactive display, and detection of a second remote device positioned on the interactive display, the detected positions being used to determine the distance between the two remote devices.

The invention provides a method in an interactive system comprising an interactive surface for displaying an image and for receiving inputs from at least one remote device, comprising the step of manipulating an image displayed on the interactive surface in dependence on data received from the remote device, wherein responsive to the step of detection of the remote device selecting an image and dragging it toward the edge of the interactive surface, further comprising the step of displaying the image on the opposite edge of the interactive surface.

The image may be a graphical user interface icon. The interactive surface may comprise a plurality of active areas, comprising the step of displaying a dragged image in a different active area.

There may be provided a plurality of remote devices, each remote device being associated with one or more active areas, comprising the step of, responsive to an image displayed in one active area and associated with one remote device being dragged by that remote device to the edge of that active area, displaying the image in another active area and re-associating the image with another remote device associated with that active area.

The invention provides a method in an interactive system comprising an interactive surface for displaying an image and for receiving inputs from at least one remote device, a displayed image being associated with a remote device, comprising the step of the position of the displayed image on the interactive surface being dependent upon a current position of the associated remote device on the interactive surface.

The invention provides a method in an interactive system, the system comprising a surface for displaying an image and adapted for receiving inputs from at least one remote device, the method comprising the steps of detecting a predetermined sequence of movements of the remote device, and responsive thereto enabling an operation.

The predetermined sequence of movements may correspond to a user gesture. The predetermined sequence of movements may be detected between a set of points. Each point may be an area within which presence of the remote device can be detected.

The method may comprise the step of beginning and ending each sequence of movements at the same point.

The method may comprise the step of enabling the operation responsive further to detection of the remote in a region above the interactive surface and not in contact with the interactive surface.

The points may comprise a start point and at least one further point. The points may comprise a central point and a set of further points positioned radially around the central point.

The set of further points may be positioned radially around the circumference of a circle having a centre at the central point.

The predetermined sequence of movements may be between any number of the points, any number of times. The predetermined sequence of movement may define a shape.

The operation may be enabled responsive to the speed of the predetermined sequence of movement.

The method may further comprise displaying the points on the surface for displaying an image.

The surface may be an interactive surface for receiving inputs from at least one remote device.

A displayed image may be an icon representing a graphical user interface. A displayed image may be an image displayed in an application. A displayed image may be a photograph.

The invention is described by way of example with reference to the accompanying Figures, in which:

FIG. 1 illustrates an example of an interactive display system;

FIG. 3 illustrates a portion of a grid array of an interactive surface associated with the whiteboard apparatus arrangement of FIG. 2(a);

FIGS. 8 to 15 illustrate examples of gestures in preferred embodiments of the invention;

Figure 2A:
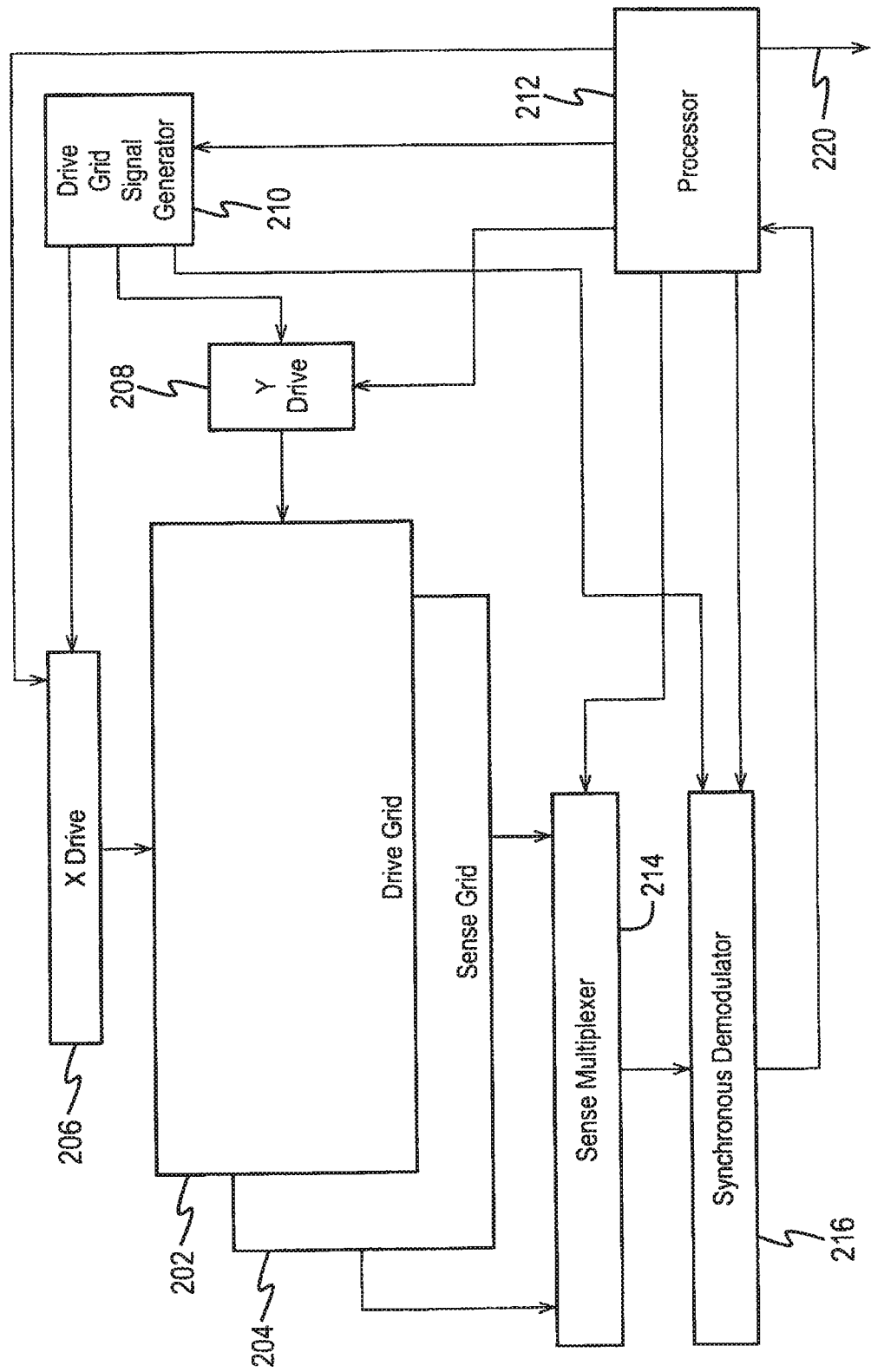
FIG. 2(a) illustrates an example of the functional elements of a whiteboard apparatus arrangement of an interactive display system.

Referring to FIG. 1, an exemplary interactive display system comprises a whiteboard assembly arrangement generally designated by reference numeral 102, a computer 107 having an associated display 106, and a projector 104. The computer 107 is connected to the whiteboard assembly arrangement 102 via a communication link 108, and to the projector 104 via a communication link 110. The projector 104, which may be fitted to a ceiling of a room such as a classroom, receives signals from the computer 107 which are translated into corresponding projection images for projection onto a display surface 114 of the whiteboard assembly arrangement 102.

The image projected on the display surface 114 of the whiteboard assembly arrangement 102 may be the same as that displayed on the screen 106 of the computer 107.

The interactive display system also includes one or more pointing devices or pointers, as represented by pointing device 112, which cooperate with the whiteboard assembly arrangement 102. The pointing device 112 is moved across the display surface 114 of the whiteboard assembly arrangement 102, in contact with or close to the surface. The position of the pointing device 112 relative to the display surface 114 of the whiteboard assembly arrangement 102 is, in one type of arrangement, detected electronically by means of a wire grid embedded beneath the display surface 114. The pointing device 112 may be moved around the display surface 114 to write on the display surface, for example, or to highlight images displayed on the display surface. The use of such a pointing device in combination with a whiteboard assembly arrangement is well-known to one familiar with the art.

Using methods known in the art, the pointing device 112 can function in the same way as a computer mouse. The pointer may be provided with buttons or such like which may be depressed, to provide for functional operations in much the same way as buttons may be provided on a computer mouse. For example, by depression of a button a displayed icon over which the pointing device 112 is positioned may be selected. For example, by depression of a button the functional operation of the pointer may change from a pen to an eraser.

In general, the movement of the pointing device 112 across the display surface 114 is detected by the embedded grid array, and such movement translated to be superimposed on the displayed image, such that the displayed image projected by the projector 104 is adapted to display any required action associated with the pointing device, as is known in the art.

The structure of the whiteboard assembly arrangement and the pointing device for operation of the interactive display system may be one of several different implementations. In a preferred arrangement the whiteboard assembly arrangement 102 includes a grid portion behind the display surface, which comprises two sets of wire loops arranged orthogonally to each other. The pointing device 112 is adapted to induce a current in the wire loops which can be used to determine the position of the pointing device 112. In a particularly preferred arrangement the pointing device 112 is a passive electromagnetic device: a drive grid induces a current in the pointing device, which in turn induces a current in a sense grid. The operation of such an arrangement is discussed further below with reference to FIG. 3 in combination with FIG. 2(a).

Electronic control circuitry is preferably provided within the whiteboard assembly arrangement 102 for processing signals generated by cooperation of the wire grid beneath the display surface and the pointing device, and to thus determine the position of the pointing device and information corresponding to any provided buttons on the pointing device being selected.

With reference to FIG. 2(a), there is shown an exemplary overview of the functional elements of a preferred whiteboard assembly arrangement, which may be provided by control circuitry associated with whiteboard assembly arrangement 102.

The exemplary whiteboard assembly arrangement 102 includes a drive grid 202 and a sense grid 204.

The drive grid 202 consists of a first plurality of conducting coils arranged in a first orientation and a second plurality of conducting coils, arranged in a second orientation, the second orientation being orthogonal to the first orientation. One set of coils, hereinafter referred to as the X drive coils, provides a set of X-axis drive coils, and the other set of coils, hereinafter referred to as the Y drive coils, provides a set of Y-axis drive coils.

The sense grid 204 consists of a first plurality of conducting coils arranged in a first orientation and a second plurality of conducting coils arranged in a second orientation, the second orientation being orthogonal to the first orientation. One set of coils, hereinafter referred to as the X sense coils, thus provides a set of X-axis sense coils, and the other set of coils, hereinafter referred to as the Y sense coils, provides a set of Y-axis sense coils.

The sense grid 204 comprises a balanced array or matrix of conducting coils laid side by side, each coil being paired with an identical but oppositely wound coil, the coils being interconnected so as to give a multi-phase output signal. The pattern of inter-connection is repeated many times over the area of the whiteboard, with each complete pattern being referred to commonly as a 'pitch'.

The sense grid 204 has two separate and independent such arrays of coils, which are placed orthogonal to each other to permit position sensing in perpendicular X and Y axes. The pattern of coils is preferably produced by wiring of a conductive material.

The drive grid 202 is also formed as two orthogonal arrays or matrices, for driving in perpendicular X and Y axes, and may be fabricated by the same techniques as is the sense grid. The drive grid comprises individual coils laid side-by-side which coils are nominally of a pitch or smaller in width.

The drive grid is connected to receive drive signals from both an X-axis drive multiplexer 206 and a Y-axis drive multiplexer 208. The X-axis and Y-axis drive multiplexers 206 and 208 provide excitation current to ones of the X and Y drive coils respectively. The drive signals are substantially sinusoidal, and are preferably generated by a programmable signal source which is locked to a stable reference frequency.

A drive grid signal generator 210 generates drive signals to each of the X-axis and Y-axis drive multiplexers 206 and 208.

The operation of the X-axis and Y-axis drive multiplexers is controlled by a processor 212, which provides a control signal to each of the X-axis and Y-axis drive multiplexers and the drive grid signal generator.

The drive grid signal generator 210 is preferably coupled to a power amplifier which boosts the available current for the drive signals. The drive grid signal generator 210 also provides clock signals as an output thereof to demodulation circuitry.

The pointing device 112 is, in a preferred embodiment, a device containing a tuned circuit. When the drive multiplexers drive an alternating current into the X or Y drive coils of the drive grid, the associated changing magnetic field induces a voltage signal in the tuned circuit of the pointing device. The resultant current induced in the pointer then causes a magnetic field which induces a voltage signal in the X and Y sense coils of the sense grid.

Figure 2B:
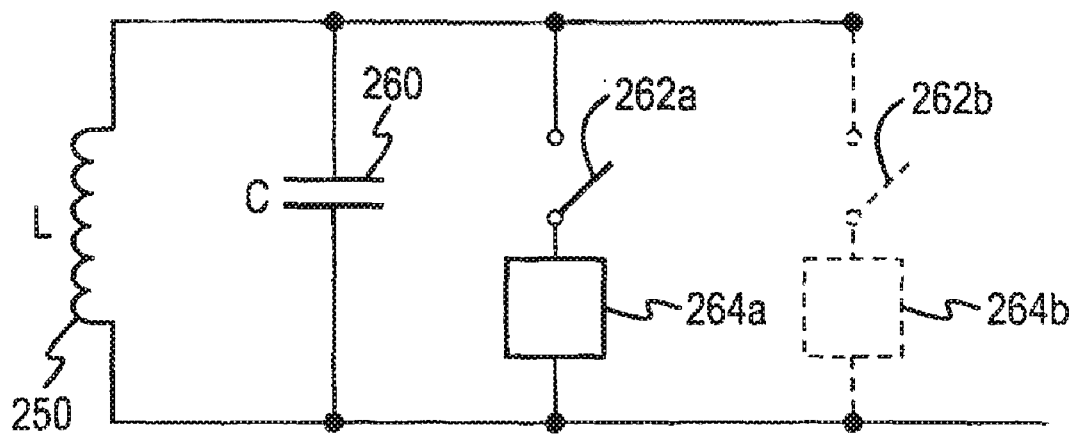
FIG. 2(b) illustrates an example functional structure of a pointing device for use with the whiteboard apparatus arrangement of FIG. 2(a)

An example of the functional elements of a prior art pointer is described in more detail with reference to FIG. 2(b). FIG. 2(b) shows schematically a circuit of a pointer for use in combination with the whiteboard apparatus arrangement of FIG. 2(a). The pointer comprises an LC tuned circuit including a coil 250 and a capacitor 260. In parallel with the tuned circuit are one or more switched resistors. In FIG. 2(b) there is shown a first series combination of switch 262a and resistor 264a in parallel with the tuned circuit, and a second series combination of switch 262b and resistor 264b. In the prior art when the pointer is in the form of a stylus or pen, the resistors may be switched either axially by depressing the stylus tip against the work surface, or radially using buttons located on the side of the pen.

In use, an alternating magnetic field at, for example, a frequency $f_1$ caused by the excitation current in a coil of the drive grid acts on the tuned circuit of the pointer, the resonant frequency of which is set to approximately $f_1$. This causes the tuned circuit to resonate, and the magnetic field produced by the coil 250 induces a voltage signal into the sense grid.

In general, the drive grid produces an electromagnetic field which couples into the coil of the tuned circuit. This electromagnetic field may induce a current or voltage in the coil of the tuned circuit. The coil of the tuned circuit produces an electromagnetic field which couples into the sense grid. This electromagnetic field may induce a current or voltage in the sense grid.

The resistors may be switched into the circuit so as to alter the Q-factor of the LC tuned circuit.

A sense multiplexer 214 is connected to receive output signals from the sense grid 204. Current induced in ones of the X and Y sense coils is detected at the sense multiplexer.

The sense multiplexer 214 provides an output which is connected to an input of a synchronous demodulator 216. After the sensed voltage signals are received by the sense multiplexer 214 they are thus de-modulated in the synchronous demodulator. The purpose of the synchronous demodulator is to reject any extraneous noise and unwanted background signals. The demodulation clock for the synchronous demodulator is derived from the drive grid signal generator 210. The demodulation clock circuitry provides both phase and quadrature data to be discerned from the sensed signals.

The digital signals produced at the output of the synchronous demodulator 216 are then output to the processor. The processor preferably processes such signals to calculate the position of the pointer. The calculated position information is then further output, via an output interface 220, to a host device such as computer 106 of FIG. 1.

The processor 212 generates control signals on outputs to each of the drive grid signal generator 210, the sense multiplexer 214, the synchronous demodulator 216, and each of the X and Y drive multiplexers 206 and 208.

The operation of the whiteboard assembly arrangement 102 and the pointing device 112 are now described in more detail.

The X and Y drive coils are superimposed to the whiteboard assembly arrangement 102 display surface 114. The drive coils of the drive grid can be selected individually and, if required, in a random fashion by the drive multiplexers under the control of the processor. When driving the X drive grid, the Y sense grid is connected to the synchronous demodulator via the sense multiplexer. Conversely when driving the Y drive grid, the X sense matrix is connected to the synchronous demodulator via the sense multiplexer.

The balanced array of each of the X sense coils and Y sense coils is such as to produce a nominal null in the sensed signal when the respective orthogonal drive coil is excited and no pointing device is present. This is due to the fact that any signal induced in one of the clockwise sense coils directly by the orthogonal drive coil will be induced in an equal and opposite sense in the corresponding counter clockwise sense coil. However when the pointer which is excited by a drive coil at its resonant frequency is placed in proximity to a sense coil it retransmits a magnetic field which induces a voltage signal in the sense coils according to its position relative to the sense coils.

FIG. 3 shows an arrangement of a Y portion of the sense grid and a Y portion of the drive grid in an exemplary embodiment. The sense grid, for the purposes of illustration in this embodiment, is of a four-phase non-overlapping type. The technique of operation is suited to many types of commonly used grid or matrix topologies and is particularly suited to topologies in which sense coils are arranged so that there is nominally a null sense voltage when no pointer is present, as discussed above.

The Y sense grid has an interconnected pattern which repeats several times across the display surface, each repeat being commonly referred to as a pitch. The number of pitches needed in any arrangement is dependent upon the width of each pitch and the size of the display surface. The sense grid permits the processor to determine with high resolution the position of the pointer within the pitch. This is achieved as follows.

Four phase signals from the sense coil are amplified and demodulated by the synchronous demodulator to generate DC voltage levels. The DC voltage levels are proportional to the amplitude of the AC signal which is being demodulated from the sense coils. The DC voltage levels are then converted into digital values by an analogue to digital converter (not shown) and are sent to the processor. The processor undertakes a vector summation on the four numbers (representing the four differently phased coils) and from this the exact position of the pointing device with respect to the four coils, i.e. within a particular pitch, is determined.

However the signal from the sense matrix alone cannot determine the absolute position of the pointer, since the processor cannot know from this information alone in which pitch the pointer is inducing the signals.

In order to determine the pitch in which the signals from the pointing device are induced, it is necessary to excite selectively the appropriate drive coils. The number of drive coils is equal to or greater than the number of pitches. For example to determine the pitch in the X axis the processor selectively energises the X drive coils and determines the peak amplitude and phase of the signals induced in the Y sense coils for each selected X drive coil. From this amplitude and phase information the X pitch is determined.

Conversely by selecting the Y drive coils and analysing the X sense coils the Y pitch is determined.

There has thus been described the functional structure and operation of an exemplary interactive display system including a whiteboard assembly apparatus.

As described in the foregoing discussion, in a typical prior art arrangement a pen-style device is used as a pointer or pointing device for interacting with the interactive surface of the whiteboard surface. However other types of devices are also provided as pointing devices.

In accordance with embodiments of the present invention the above-described interactive display system is adapted to incorporate more than one pointing device which may be used in co-operation with the interactive surface at any one time. In the following description an exemplary arrangement will be referred to in which two pointing devices are provided. However it should be understood that the principles described apply to the provision of any number of a plurality of pointing devices, and is not limited to two.

Figure 4:
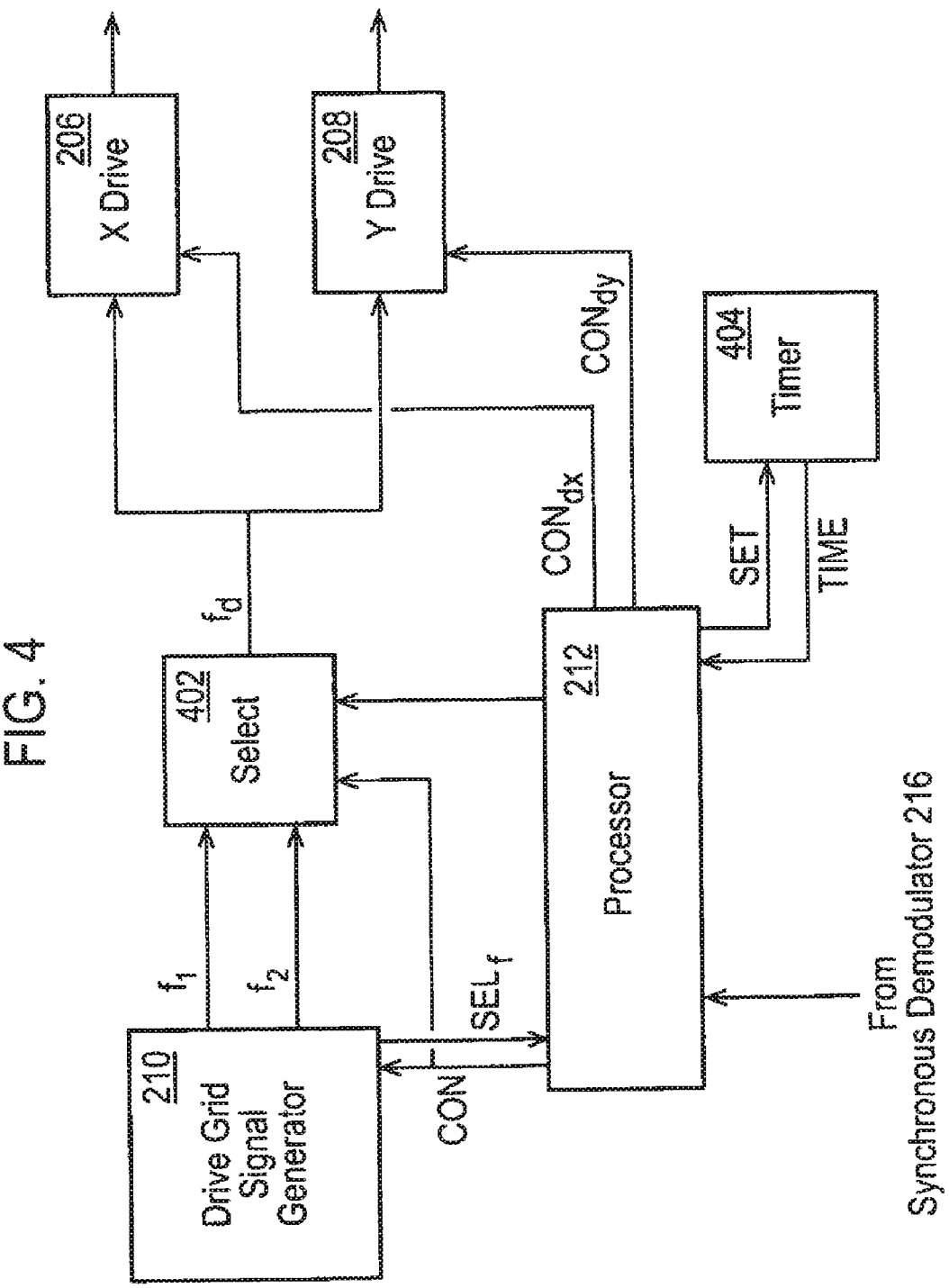
FIG. 4 illustrates an example of the functional elements of FIG. 2(a) further adapted to support embodiments of the invention.

With reference to FIG. 4 an exemplary arrangement of the functional elements of the whiteboard apparatus arrangement of FIG. 2(a), modified to support the provision of multiple pointing devices, is described. For the purposes of example an implementation with two pointing devices is described.

In order to distinguish between the two pointing devices in use at the same time on the interactive surface, each of the pointing devices is provided with a unique nominal frequency. That is the frequency of each pointing device is within a pre-allocated unique frequency band. For the purposes of this example it is assumed that one pointing device is allocated a nominal frequency $f_1$ and another pointing device is allocated a nominal frequency $f_2$.

The functional elements of the whiteboard apparatus arrangement operate in a manner similar to that described hereinabove, for each distinct nominal frequency. The drive grid signal generator 210 is adapted such that it can generate a nominal frequency of either $f_1$ or $f_2$. In the arrangement of FIG. 4 the drive grid signal generator 210 is shown to generate two distinct frequencies on two distinct signal lines. In practice, however, the drive grid signal generator 210 may be a programmable signal generator, having a single output, on which line one of frequencies $f_1$ or $f_2$ is generated at any one time. In the arrangement of FIG. 2, a selection circuit 402 is connected to receive the two lines carrying the frequencies $f_1$ and $f_2$, and provide one of such frequencies on an output line as a drive frequency denoted by $f_d$. The selection block 402 operates under the control of a control signal CON from the processor 212. This control signal may also provide to the drive grid signal generator 210.

The processor 212 interfaces with a timer device 404. The principle of operation is that the drive grid or drive array of the interactive surface is driven for a period of time at the nominal frequency $f_1$, and then driven for a subsequent period of time at the nominal frequency $f_2$. This alternative driving is then repeated. Preferably the drive grid is driven at the two frequencies for an equal amount of time. In the arrangement of FIG. 4 the timer 404 is provided to facilitate this operation. The processor 212 sets the timer 404 using a control signal SET. The processor 212 then monitors the current time provided as a signal TIME from the timer 404. When the appropriate time has elapsed the processor 212 sets the control signal CON to switch the select block 402 and thus switch the drive frequency.

As in the typical interactive display systems described hereinabove with reference to FIG. 2(a), the drive frequency $f_d$ is provided to each of the X drive block 206 and Y drive block 208. The X drive block 206 and the Y block 208 are controlled by the processor 212, via respective control signals $CON_{dx}$ and $CON_{dy}$. Thus the driving of the drive grid is carried out in a similar manner to that described earlier herein, the difference being that the drive frequency alternates between the two nominal frequency values.

As described in relation to the arrangement of FIG. 2(a) hereinabove, the processor 212 receives a signal from the synchronous demodulator 216. Thus the processor 212 is able to detect when a signal is provided by the synchronous demodulator 216 indicating the presence of a pointing device. If such a signal is detected, this indicates that a pointing device having the current drive frequency is present on the interactive display. The drive grid signal generator 210 preferably provides an indication to the processor of the current selected frequency by way of a signal $SEL_f$, and therefore when the processor 212 processes the signal from the synchronous demodulator in order to determine the position and status of the pointing device, this information can be determined as being associated with the specific pointing device.

Figure 5:
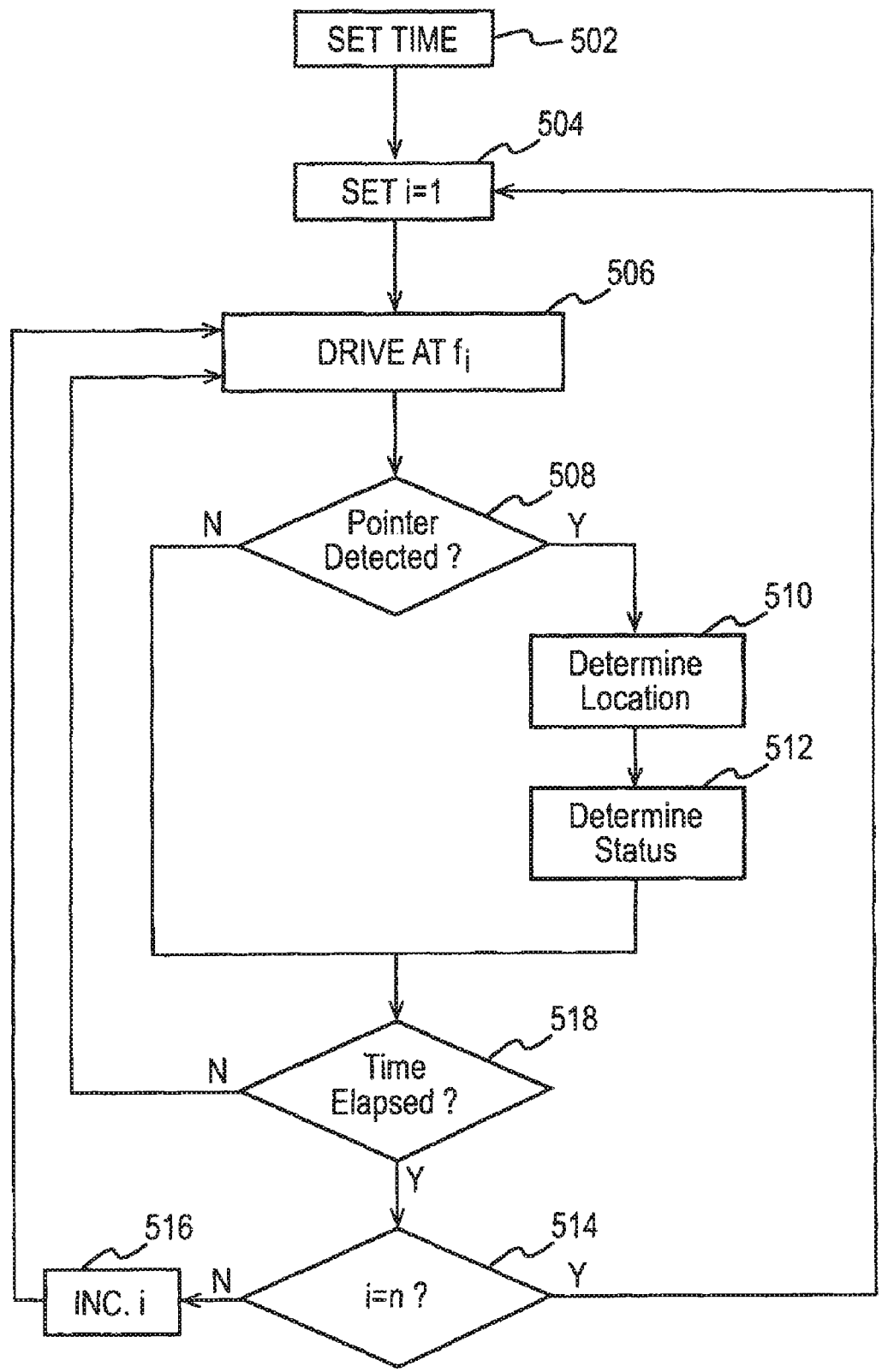
FIG. 5 illustrates an example flow chart for operation of the functional elements of FIG. 4.

The operation of the interactive display system in accordance with these principles is now further explained with reference to the flow diagram of FIG. 5.

In a step 502 a time period is set. This may be a default time period which is set in dependence upon the number of pointers intended to be in use. A nominal time period will be set, and subdivided in accordance with the number of pointers to be used. Thus where two pointers, are to be used, this time period will be divided by two, where three pointers are to be used this time period will be divided by three etc. The appropriately divided time period is then set as a time value and stored under the control of the processor 212.

In a step 504 an integer value i is set to 1. For the purposes of a general example, it is assumed that in general there may be n pointers in use in the system at any one time.

Thereafter in a step 506 the drive grid is driven at a frequency $f_i$. As i is currently set to 1, the drive grid is driven at frequency $f_i$.

In a step 508 it is determined whether a pointer is detected. This is indicated by the synchronous demodulator output being processed by the processor 212 as is known in conventional systems.

In response to a pointer being detected in step 508, based on a signal from the synchronous demodulator 216, the processor processes the received information in a step 510 to determine the location of the pointer (i.e. the X-Y location), and in step 512 determine the status of the pointer (button depressions) if appropriate.

If no pointer is detected in step 508, or alternatively on completion of steps 510 and 512 where a pointer is present, in a step 518 it is determined whether the set time has elapsed. If the set time has not elapsed then the process returns to step 506 and the process repeats. If the set time has elapsed then in a step 514 it is determined whether i is currently set at the value n. If the value i is currently set at the value n then all available frequencies have been scanned, and the processor returns to step 504 and i is reset to 1.

If in step 514 it is determined that i is not equal to n, then there remain other frequencies to be processed in the cycle. In a step 516 the value of i is incremented, for example to 2, and then the drive grid is driven at the new frequency $f_i$ (e.g. $f_2$) in step 506 and the above described steps repeated.

Thus in general in a first time period the drive apparatus is set to a frequency associated with one of multiple pointing devices and the X-Y position and status of that pointing device is determined. In the next period the frequency is set to another device frequency and again the position and status determined.

The implication of this sequential operation is that the update rate for each pointing device is directly dependent upon the number of devices present. In a practical system all the pointing devices potentially in use are not in proximity with the surface all of the time, and the system may be controlled such that if no pointing device of a particular frequency is detected in a particular cycle or in a particular number of cycles, the sampling rate for that frequency is reduced until a device operating at that frequency is found, at which point the sampling rate for that frequency returns to the highest rate. As discussed hereinabove the highest sampling rate is preferably the total maximum rate divided by the number of devices in use. In certain situations, however, some particular devices may be associated with an application which does not require the highest data rate, and the system may adapt the sampling rate for any given frequency to optimise the sampling rate of particular devices to maximise their performance. This may involve providing a sampling rate higher than the nominal sampling rate for certain devices, whilst providing a sampling rate lower than the nominal sampling rate for other devices.

It should be noted that it is not essential that the various frequencies be sampled alternately. The described technique is merely exemplary.

In a preferred arrangement of the invention the drive grid signal generator 210 is adapted such that it may lock onto the centre frequency of a coil provided in a pointing device operating at a nominal frequency. Thus the drive grid signal generator may initially drive the grid at a frequency $f_1$, and then lock on accurately to the actual frequency of a pointing device having a nominal frequency of $f_1$.

It should be further noted that each individual pointing device may operate in accordance with the operation of conventional pointing devices. In a preferred arrangement this involves the detection of the status of a pointing device in dependence upon the alteration of its Q factor. The depression of a button on a pointing device, for example, alters the Q factor of the device which can then be detected to determine its status. Thus in the preferable arrangement the pointing device always operates at its nominal frequency, with its status being determined by adjustment of its Q factor.

The data for each pointing device can be processed separately, and this information may be passed to any application that is designed to process the data for a particular pointing device.

In general, for an interactive display system, a pointing device has two purposes. A first purpose is to control system functionality, and a second purpose is to allow use of applications. In order to control system functionality a pointing device is able to operate as a conventional 'mouse' device when connected to a computer. Thus the pointing device is able to control the operating system such as a Windows operating system, of the computing system of which the interactive system forms an interface.

To support use in various applications, the pointing device acts as an input device. For example in a drawings package the pointing device may be used to draw lines etc. on a 'work pad' surface displayed.

In a preferred arrangement of the present invention, for use in interactive systems, a first pointing device is defined as a system pointing device, and one or more further pointing devices are defined as multi-mode pointing devices. These pointing devices alternatively may be referred to as a 'system pen' and a 'private pen' respectively.

A system pointing device is able to control the operating system, in a way that a computer 'mouse' does, and preferably is also used for interacting with various applications. A multi-mode pointing device is, however, not able to control the operating system. A multi-mode pointing device is able to interact with an application which is configured for multi-pointing device use. In general a system pointing device can interact with all applications, whilst a multi-mode pointing device can interact only with multi-pointing device specific applications.

It should be understood, for the purposes of this description, that a 'system pointing device' is a pointing device that can be used in any standard application, as well as applications supporting multiple pointing devices. A 'multi-mode pointing device' preferably cannot interact with standard applications, but can preferably only interact with applications supporting multiple pointing devices.

The system pointing device preferably has overall control of the interactive system. This preferably includes the system pointing device having control of any multi-mode pointing device. Specifically the system pointing device may be able to enable or disable any multi-mode pointing device, to control the use of the multi-mode pointing device. When the system pointing device disables the multi-mode pointing device, the apparatus of FIG. 4 may be controlled such that the drive grid is never driven at the nominal frequency of that multi-mode pointing device and thus that multi-mode pointing device is never detected regardless of its presence on the interactive surface. Preferably an icon may be displayed on the interactive surface which the user of the system pointing device may 'click-on' to enable/disable any multi-mode pointing device.

It is emphasised that in accordance with the present invention there is provided a technique which enables a plurality of pointing devices, of any number two or greater, to be used together in an application. For the purpose of clarity, in the following examples are presented of a two pen operation. However this limitation of the multi-pen principle to a dual-pen example is purely illustrative.

On the basis of a 'dual-pen' example, the following operational scenarios can be envisaged:

1) A teacher may use the system pointing device only. The teacher controls the operating system and standard applications. The teacher never launches an application which requires a dual input, or does not use dual input functionality of other applications. This is, in effect, a mode of operation equivalent to use of a typical conventional whiteboard system.

2) A teacher uses the system pointing device primarily. The teacher can use the system pointing device to launch a dual application. The teacher may then use both the system pointing device and the multi-mode pointing device in the dual application. The teacher uses the system pointing device to close the dual application.

3) A teacher uses the system pointing device primarily. The teacher can use the system pointing device to launch a dual application. The student is then given a multi-mode pointing device to work alongside the teacher in the dual application. Using the system pointing device, the teacher can discretionally switch the input from the multi-mode pointing device on or off. The teacher uses the system pointing device to close the dual application. The student cannot use the multi-mode pointing device to operate anything outside of the dual-application.

4) A teacher uses the system pointing device to launch a dual application. The system and multi-mode pointing devices are then given to two students to operate the application. The teacher can provide overriding control using a standard 'mouse' attached to a computer associated with the interactive system.

Allowing two users to interact simultaneously with an application brings new problems to consider. Many scenarios can be considered, such as two people writing at the same time, both moving objects into position, one person annotating in a flipchart whilst the other person drags images from the resource library. The possibilities are almost limitless.

Example dual-input applications may include:
Dual Draw
Dual Colouring In
Dual Jigsaw
Dual Concept Mapper
Dual Image Editor
Dual Image Sorter
Dual Musical Instrument. Player
Dual Drum Kit
Dual Note Taker
Dual Connect 4
Dual Maths Challenge
Dual Paddle Football It is advantageous to design a dual or multi-user application such that the participants are kept mainly to their respective sides of the board. This helps in two respects. Firstly it prevents users getting in each others way, and secondly it allows the audience to more clearly observe the central area of the whiteboard where the activity is taking place.

Consider a Jigsaw application. One person might drag a jigsaw piece from the left-hand side to the right-hand side of the board whilst another person is dragging a piece the other way. In this situation the two people may have to step under and over each other whilst trying to keep the pointing devices on the board in order to maintain the drag operations.

This problem can be overcome by ensuring that each jigsaw piece is initially arranged such that it is randomly positioned in its correct half of the board, i.e. that half in which it will be located on the finished jigsaw. Also, the careful layout of pieces will help to minimise the time spent by the participants in the central area of the board, hence allowing the audience to see the formation of the jigsaw more clearly.

An example application for multi-pen use may be a technical drawing surface. In this one pen is used to move and 'pin' a displayed ruler into position on a grid, whilst the other pen is used to draw straight lines along the edge of the ruler.

The ideal position for tools and toolboxes is down either side of the board. Some tools can be for the system pointing device only (e.g. file open/save commands); others may be for the multi-mode pointing device; some are for both.

With a system pointing device it is possible to feed data into the application from two streams; the operating stream and the application data stream. This can cause problems within the application. Therefore preferably any dual input data entering the application is only accepted from the application data stream. The operating stream may be used for standard operations within the application.

Preferably it will be possible for a user to configure each pen to be a system pen; a private pen; both; or neither. A simple software utility may allow the end user to override the default pen configurations.

If both pointing devices are configured to be system pointing devices, each pointing device will behave like a standard pointing device on a typical whiteboard system (with the exception of the data rate). They will both be able to fully control the operating system and standard applications running on it. They will interfere with each other if both are placed on the surface at the same time. In this configuration, it will not be possible to correctly control any dual applications.

One reason for a user wanting to set this generally undesirable mode of operation would be to allow them to increase the quantity of standard 'single use' pens available within the classroom. However, it should be noted that the performance of each pen on the board will be half that of a single pen in single pen mode, and this mode is therefore generally not advantageous.

If a user configures both pointing devices to be multi-mode pointing devices, they will only operate in a dual application. Neither pointing device will operate the operating system generally at the interactive surface. In all configurations the physical mouse will continue to control the operating system as normal. This configuration may be useful where the teacher wishes to lock two students into a dual application at the whiteboard, whilst maintaining system control using the physical mouse (e.g. whilst sat at the desk).

In another configuration, both are configured as system pointing devices and multi-mode pointing devices, and can control the operating system and a dual application. Again, the pens will interfere with each other within standard operating system applications, and therefore this mode will likely have limited usefulness.

If both pointing devices are configured as neither system nor multi-mode pointing devices then all pen input at the board is ignored. This may be useful if the teacher requires to temporarily prevent students from interacting with the board while the teacher performs some activity at the desk using the mouse. If one of the two pointing devices is configured as neither, then all pointing devices of that nominal frequency will be ignored. In this case the data rate of the remaining pointing device may be increased to the maximum value possible.

The optimum configuration is likely to be to configure one pointing device as a system and multi-mode pointing device; and one or more others as multi-mode pointing devices only.

Pointing devices are preferably provided with a default configuration of one pointing device configured as a system and application pointing device, and one or more further pointing devices configured as multi-mode pointing devices. An application package may be provided for the interactive whiteboard system which enables a user to change the configuration of any pointing device. The system, under control of the processor, may dynamically configure the operation thereof in accordance with the pointing devices configured by a user or in use. The user may be able to define how many different pointing devices are to be used for a given application, and the processor can then dynamically adjust the frequency generation for driving the drive grid in accordance with an appropriate number of frequencies. Where any pointing device is disabled at any time, the associated driving frequency can be disabled.

Support for more than one pointing device with the interactive system requires that:
  a) the interactive whiteboard system is instructed to detect more than one pen.
  b) an interactive whiteboard system driver is instructed to differentiate the data from each pen.
  c) a dual pen aware application is configured to receive the pen data from an interactive system device driver.

Figure 6:
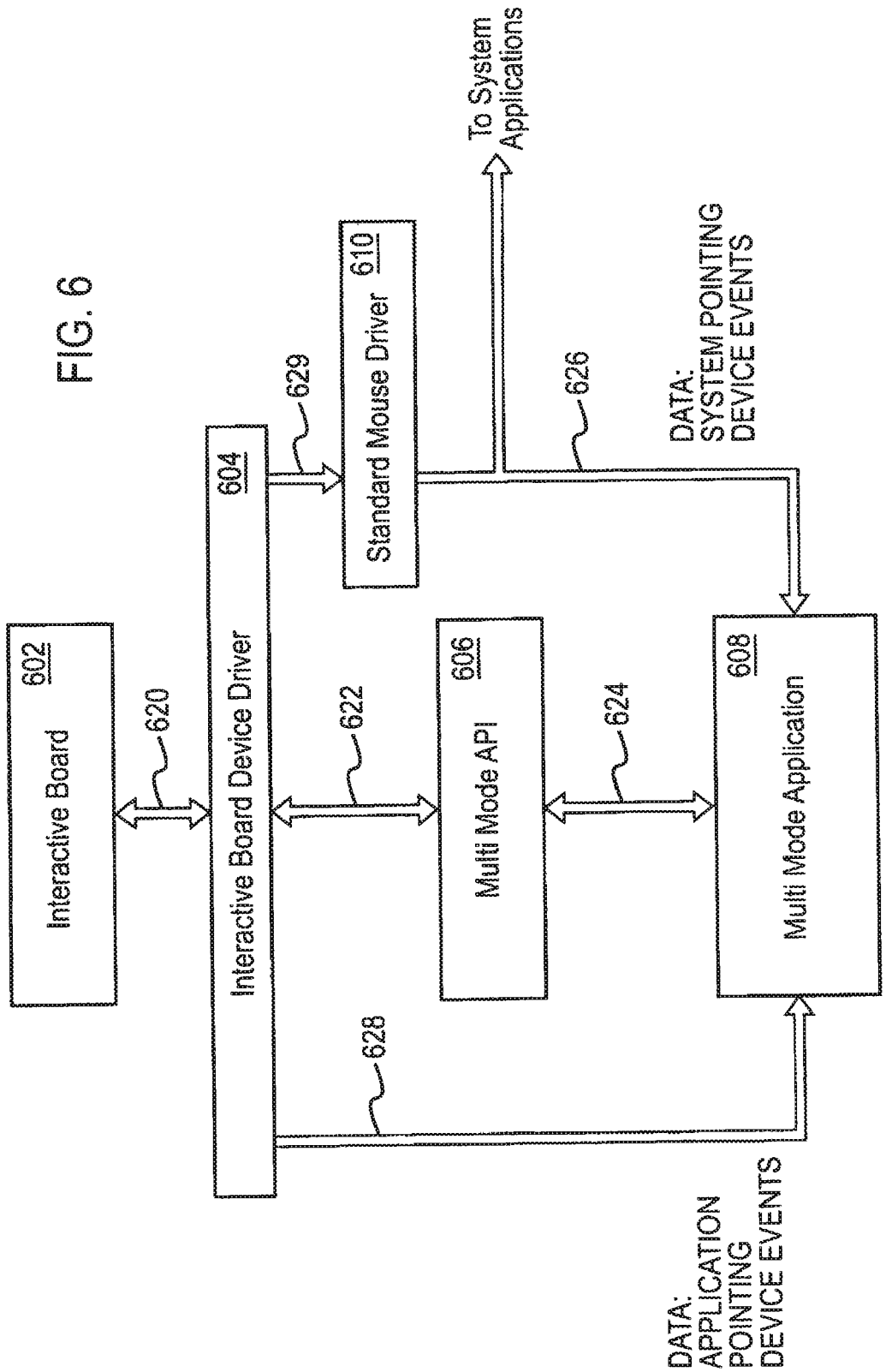
FIG. 6 illustrates a software architecture in a preferred embodiment.

With reference to FIG. 6 the operation of a multi-mode configured interactive display system is further described. FIG. 6 illustrates the main software architecture for achieving multi-mode operation in accordance with preferred embodiments of the invention.

Block 602 represents the interactive board. In a preferred embodiment the interactive board incorporates all the system functionality of the interactive operation as illustrated in FIGS. 2(a) and 4 as described hereinabove. The interactive board 602 interfaces with other functional elements of a computer system associated with the interactive system via an interface 620. The interface 620 may be a USB, Serial, Bluetooth or other type of interface. The interface may thus be wired or wireless.

The interactive board 602 communicates with an interactive board device driver 604 over the interface 620. The interactive board device driver 604 communications with a multi-mode API (Application Program Interface) 606 over communications interface 622. The multi-mode API 606 communicates with a multi-mode application 608 over communication interface 624. The interactive board device driver 604 communicates with a standard mouse driver 610 over communication interface 628. The standard mouse driver 610 communicates with a multi-mode application 608 over communication interface 626. The communication interface 626 also communicates with system applications. The interactive board device driver 604 is further connected to communicate with a multi-mode application 608 over communication interface 628.

The multi-mode application 608 represents a software application supporting multi-mode use. In other words the multi-mode application 608 is an application provided for a user, which has functionality which allows two or more pointing devices to be used on the interactive surface simultaneously. As will be understood by one skilled in the art, multiple such applications may be provided, and these applications may be provided in combination with single mode applications. One multi-mode application 608 is shown in FIG. 6 for ease of explanation.

When installed, or activated, the multi-mode application 608 sends an instruction, or series of instructions, to the interactive board device driver 604 via the multi-mode API 606 using communication interfaces 624 and 622. The interactive board device driver 604 then sends any received instructions to the interactive board 602. In embodiments where the interactive board 602 may switch between functional modes, such received instructions may cause the interactive board 602 to switch into 'multi-mode'. This may require, for example, the interactive board 602 to switch into a mode where the drive grid is driven by multiple frequencies. Depending on the multi-mode application 608 the instructions sent to the interactive board 602 in this way may provide information as to the number of multiple pointing devices allowed to be in use at any one time. Where the user is configuring use of the application via the user interface, the user may indicate to the application the number of pointing devices to be used. The instruction sent by the multi-mode application may then indicate to the interactive board 602 the number of devices in use so that the appropriate frequencies can be set.

Preferably the instructions sent to the interactive board 602 additionally include an identification of the pointing devices that will be in use. The identification of the pointing devices may then be used by the interactive board 602 to identify the frequencies with which the drive grid should be driven. Thus on the basis of instructions received from the multi-mode application 608 the interactive board 602 is configured to drive, and detect, a certain number of frequencies associated with a certain number of pointing devices.

In general once configured to operate in a particular mode of operation, and particularly to search for a particular number of frequencies, the interactive board 602 will continue in this mode of operation until either instructed otherwise or until there is a power-down operation.

The interactive board device driver 604 also responds to instructions from the multi-mode application 608 as to the number of pointing devices in use. The interactive board device driver 604 is also provided with information as to the type of such pointing devices, i.e. whether they are system or multi-mode pointing devices (or both).

The interactive board device driver 604 is adapted in order to interpret and process data from each pointing device separately. The interactive board device driver 604 may interpret the data from one or more pointing device as:
  (i) system data (from a system pointing device or mouse); (ii) application data (from a multi-mode pointing device); (iii) both; or (iv) neither.

Thus the interactive board device driver 604 receives data on communication interface 620 from the interactive board. In dependence upon the pointing device from which such data is received, the interactive board device driver will transmit that received data on either communication interface 628 or communication interface 629. Data from application pointing devices is provided on communication interface 628, and data from system pointing devices is provided on communication interface 629. As illustrated in FIG. 6 the multi-mode application 608 receives the data associated with multi-mode pointing devices on communication interface 628 directly, and receives the data associated with system pointing devices on communication interface 626 from the standard mouse driver 610. The standard mouse driver 610 may also provide data from system pointing devices on communication interface 626 to other system applications, such as associated with operating system interactions, rather than to the specific multi-mode application 608.

The multi-mode application 608 registers with the interactive board device driver 604 in order to receive data from different pointing devices in multi-mode operation. The interactive board device driver 604 is adapted to store one or more registered application target addresses, such as a target address for multi-mode application 608, to which application data received from application pointing devices is to be sent to.

Preferably data received from the interactive board 602 on communication interface 620 and associated with application pointing devices comprises:

i) a unique pen identification number (such as 'pen 1', 'pen 2');

ii) pen state (e.g. 0=no button pressed; 1=button 1 pressed); and iii) the location position of the pointing device on the interactive surface (i.e. x-y coordinates).

As mentioned hereinabove when a system pointing device is placed on the interactive surface of the interactive board 602, the interactive board device driver 604 will receive associated data and forward it to the standard mouse driver 610 as occurs in normal interactive system operation (i.e. where only one pointing device is provided). Any application, being a multi-mode application or otherwise, therefore receives system pointing device data via the standard mouse driver as a result of operating system events.

Data received by the interactive board device driver 604 from multi-mode pointing devices is passed to all multi-mode applications which have registered with the interactive board device driver 604 for receiving the application pointing device data. This data can be sent, for example, via post messaging or by calling a call-back function within each registered application.

In an alternative arrangement the interactive board device driver 604 may store the data from any pointing device within a storage buffer, and provide this data to any application upon request. A multi-mode application may, for example, poll for this buffered data.

Some applications utilising multiple pointing devices will now be described. For the purposes of this discussion the pointing devices are referred to as pens, although it will be understood that the principles are not limited to pens.

All multiple pen applications are based upon the application programmatically making specific decisions about how to process the separate pen event streams entering the application.

As in previous examples described above, in the following examples of dual-pen applications are described for simplicity.

A first application is simultaneous input. A dual pen application can be programmed so that certain inputs can occur at the same time from two or more pens. Simple examples are where both pens are annotating a document displayed on the interactive surface; or one pen is annotating and one pen is moving (graphical user interface) GUI objects; or both pens are moving GUI objects; etc.

A second application is assigning permanent functionality to pens. An application can be programmed such that one or both pens are given a permanent function. A simple example is where one pen is permanently associated with an eraser function and will therefore always erase any annotation made on the interactive surface by the other pen. In this instance the 'pen' may be constructed such that it physically looks like a real board eraser.

A third application is assigning selectable functionality to pens. An application can be programmed such that the user can specify a selectable function for each pen. A simple example is where a first pen is set to annotate and a second pen is set to erase. At any time, the user can choose other functionality for any pen by clicking on a GUI toolbox of available functions. For example, the second pen could be made to behave as a highlighter by clicking the second pen on a 'highlighter' GUI icon. The functionality of each pen can be stored and re-applied to the pens by the dual-mode application between sessions. A further example of this application is where each pen could be assigned a different language for the purpose of handwriting recognition. For example the annotations from the first pen could be always recognised as English words, and those of the second pen as French words.

A fourth application is splitting the dual application input surface into 'pen specific' active areas. A dual pen application can be programmed so that certain areas of the display associated with the application may be interacted with via either, both or neither pens. These areas may be any shape and quantity. In a simple form, a first pen could be configured to only work on the left half of the interactive surface, and the second pen on the right half. This facility may promote the development of dual applications of a competitive nature whereby each user is restricted to their own half of the surface in performing similar tasks.

This process involves the application holding a list of board areas against the pen identifiers. When a pen event enters the application, the application compares the pen's x-y position to decide if it lies within one of the areas associated with its pen identifier. If not, the event is ignored otherwise the application can process the event.

This process could be generalised to areas of the operating system real estate by making the device driver process the areas, and restricting or allowing pen data accordingly. This particular function would only operate with system pens and would only facilitate turn based click activities (not simultaneous pen movements).

There are potentially three ways of defining the active portion of the interactive surface for a particular device. Firstly firmware can be used. The interactive display may have either fixed or downloadable defined areas such that if the device is outside of its predefined area the interactive system will not send any data to the host system. A second way uses the drivers. A driver could be intelligent in the same way as the firmware solution by having predefined either fixed or loadable areas for each device, and only when a particular device is within its own operating area will the driver pass the information up to the application. A third way is at the application level. The active portions of the interactive surface may be defined via software. This is the most advantageous and flexible way to provide the functionality. The interactive surface and the driver pass all the data for all of the devices up to the application. The application then controls the area in which each pointer is active. The advantage of this approach is that it offers much greater flexibility in defining areas, and these areas can be much more easily changed 'on the fly' dependent upon changes within the application or application switching.

A fifth application is pen specific GUI elements. A dual pen application can be programmed so that certain GUI interface elements are associated with either, both or neither pens. A simple example of this is an interface button being associated with the second pen. In this example only the second pen is able to click on the button, whilst use of the first pen on the button is ignored by the application.

Further examples include creating pen specific GUI toolboxes and actions.

A sixth application is one pen controlling the operation of the other. A dual pen application can be programmed so that the operation of the second pen is dependent upon some action performed by the first pen (or vice versa). A simple example is where the second pen does not function until the first pen is used to click a GUI element (e.g. a button entitled 'enable $2^{nd}$ Pen'). This promotes the idea of the teacher-pupil scenario where the teacher can decide when to allow the pupil (with the second pen) to interact with the dual application by toggling the 'enabled state' of the second pen via a GUI element with the first pen.

A seventh application is GUI tasks performed by combined pen actions. A dual pen application can be programmed so that certain operations can be performed on GUI objects contained within the dual pen application when using both pens together.

Examples of these are:

Rotating an object. Place both pens on the same GUI object (e.g. an image) and rotate the one or both pens physically about each other to alter the angle of the underlying GUI object by the same physical increment angle traced by the pens.

Steering an object. Place both pens anywhere on the same GUI object (e.g. an image) and move the pens in the same general direction. The object will follow the movements of the pen and will be rotated according to the relative angle between the two pens in order to 'steer' the object into a specific location and orientation.

Aspect sizing an object. Place both pens anywhere on the same GUI object (e.g. an image) and move one or both pens closer together or further apart. The underlying GUI object will alter in size by an amount which is directly proportional to the physical change in distance between the two pens.

Stretching an object. Place both pens approximately on opposite edges (or corners) of the same GUI object (e.g. an image) and move one or both pens closer together or further apart. The underlying GUI object will alter in size and aspect as dictated by the change in pen positions.

Splitting an object in two. Place both pens near each other and near the same edge of the same GUI object (e.g. an image) and move one or both pens further apart. The GUI object will be split into two GUI objects, the split point being defined as the point on the edge of the original object that is midway between the starting positions of the two pens.

Joining two objects. Place each pen on a different GUI object (e.g. two images). Use the pens to bring two edges of the two GUI objects within close proximity of each other. Release the pens. The two GUI objects are joined together as one GUI object.

Connecting two objects. Place each pen on a different GUI object. Without removing the pens from the board, drag the two objects together so that they partially overlap, then drag them apart again. This action can be detected by the application and the two objects can then be shown connected (e.g. via a line being drawn between them). Similarly, two connected objects can be disconnected by repeating this action.

Duplicating an Object. Place the first pen on one GUI object and do not move it. This object is now classed as anchored (or pinned) in place. Place the second pen on the same GUI object and drag the second pen away from the first pen in order to introduce a duplicate copy of the pinned object which is then dragged by the second pen.

Cropping an object. Place both pens on the same GUI object (e.g. an image). The two pens form the opposite corners of a cropping rectangle which can be indicated on screen. The pens can then be moved in order to adjust the cropping rectangle. The cropping function can then be performed by clicking either pen on another GUI element or simply by removing the pens from the board surface.

Measuring Distance. Place both pens on different points in an application. The distance between the two pens can be calculated based upon the current scale factor of the application.

An eighth application is application pen interaction over the operating system. A dual pen application can be programmed such that whenever application pen data is received, this can be displayed in a transparent window over the operating system. This allows for one person to use a system pen in order to interact with any standard application (e.g. Word), whilst the user of the second pen uses application pen data to simultaneously annotate (or manipulate other GUI elements) over the top of the standard application without interfering with the activity of the system pen.

A ninth application is 'wrap around' desktop. Users of the dual mode interactive system may stand at either edge of the board allowing the central projected portion of the board to be clearly visible to the audience. In order to facilitate sharing GUI elements (e.g. toolboxes), a first person (with a first pen) at the left hand edge of the desktop is allowed to drag a GUI object off the left hand side of the desktop and for it to appear at the right hand side of the desktop (or vice versa) for use by the second person (with a second pen).

A tenth application is throwing objects. Additional to 'wrap around' desktop is the idea for a first person (with a first pen) at either side of the interactive surface to click and drag on a GUI object (e.g. a toolbox or colour palette) and to describe a 'quick flick' motion in the direction of the opposite side of the board in order to transfer the selected GUI object across the screen surface to the other edge of the board, in order that it can be used by a second person.

An eleventh application is automatic left/right docking. If a GUI element is associated with a specific pen, the application can track the position of the pen and can alter the docking, of the GUI element accordingly. One example is where both pens each have their own toolbox, docked at the left and right hand edges of the interactive surfaces. If the users switch sides (i.e. they both physically walk to the opposite sides of the board), the application can detect that the pens are now generally being used on the opposite halves of the board and can therefore automatically switch the docked toolbars to the opposite sides of the board.

A twelfth application is interacting with general standard applications. When configuring both pens to be system pens, the device driver can then be instructed to operate in a mode where it remembers each pen position and button state, such that it can generate, interleave and send standard mouse events to the mouse driver for both pens. This involves inserting artificial mouse-up-move-down events between data packets generated by sequential multiple pen data arriving at the device driver. This approach will allow both pens to simultaneously operate different parts of the same standard application, or for each pen to operate a different standard application.

This allows the majority of drawing and standard interface GUI objects to be interacted with simultaneously with both pens.

One example is that a first pen may be used to scroll the vertical scrollbar and the second pen may be used to scroll the horizontal scrollbar of any application, simultaneously. A second example is that both pens may be used to draw and move objects around any standard graphics application simultaneously.

In accordance with further embodiments of the present invention the above-described interactive display system is adapted to allow for additional functionality.

Figure 7:
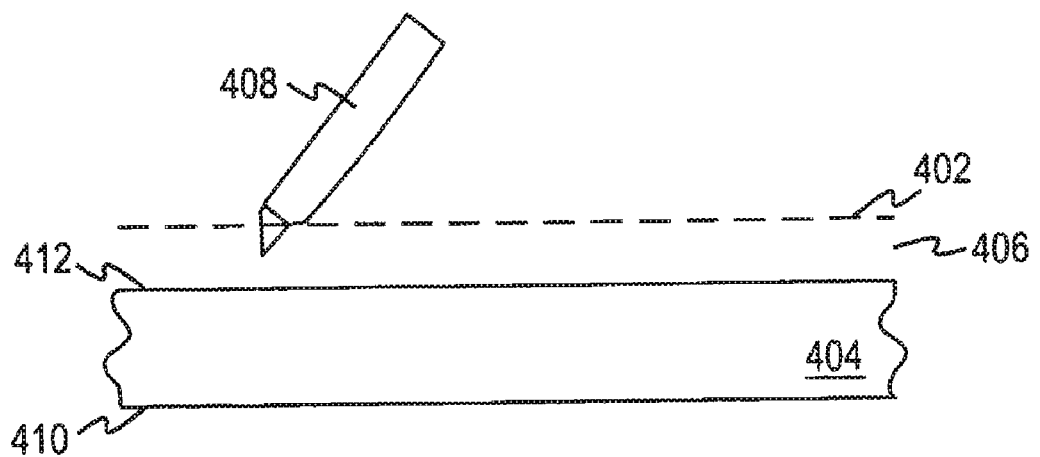
FIG. 7 illustrates the interactive surface of an exemplary interactive system.

Referring to FIG. 7, there is shown a portion of the interactive surface 704 having an upper surface 710 which in use may comprise the work surface and a lower surface 712 which in use may be mounted against a wall. In use a pointing device such as pen 708 is moved around the work surface to provide operation similar to a mouse device as discussed hereinabove. The pen contacts the surface 712 in order to interact with the interactive surface and provide inputs.

Above the work surface there is provided a region 702 which extends from the surface 712 to a distance as denoted by dashed line 702. This is a region in which an interaction still occurs between the pen 708 and the interactive surface 708, such that the presence and movement of the pen 708 may be traced. This region 706 may be referred to as a proximity layer or a layer of interaction above or along the interactive surface. This layer of interaction is just above the surface of the board, to a height of approximately 8 mm.

The pen 708 may still move and be detected in this layer of interaction, to move a displayed cursor, without the pointing device touching the surface. The principle of position sensing of the pointer device within the proximity layer is known in the art.

The pointing device may be used to describe one or more 'gestures' within the interactive surface proximity layer. These described gestures may be then recognised, in accordance with predefined principles, and their detection used to invoke predefined actions within an application running on the interactive system. This operation may be performed without interfering with the underlying displayed image material because the pointing device does not physically touch the interactive surface whilst making the gesture. Thus a distinction is made between movement of the pointing device to control an interaction with an application and cause the displayed image to change, where the pointing device must physically touch the interactive surface, and movement of the pointing device proximate but not in physical contact with the interactive surface, which preferably does not cause the displayed image to change.

This functionality is described in the context of an exemplary interactive system which utilises electromagnetic interactive surfaces. It cannot be achieved with touch sensitive boards. The functionality can also be achieved, however, with optical technology. The use of gesture actions provide a user with a significant productivity benefit.

By way of example, a gesture might be used to switch tools from a pen tool to a marquee select tool. A further distinct gesture might call up a colour selection panel. Using just these two gestures anywhere over the interactive surface allows the user to annotate in any colour and move the annotations around without ever requiring the user to access the main toolbox.

Gesture actions may be disabled by default, and be enabled and configured within settings as discussed further hereinbelow. A number of gestures are preferably predefined.

In use, each gesture is made by moving the pointing device from a notional central starting point, out to one or more notional secondary points (which may be referred to as gesture points), and finishing back at the centre point. The gesture thus essentially traces the pointing device over a number of dots within close proximity.

Figure 8:
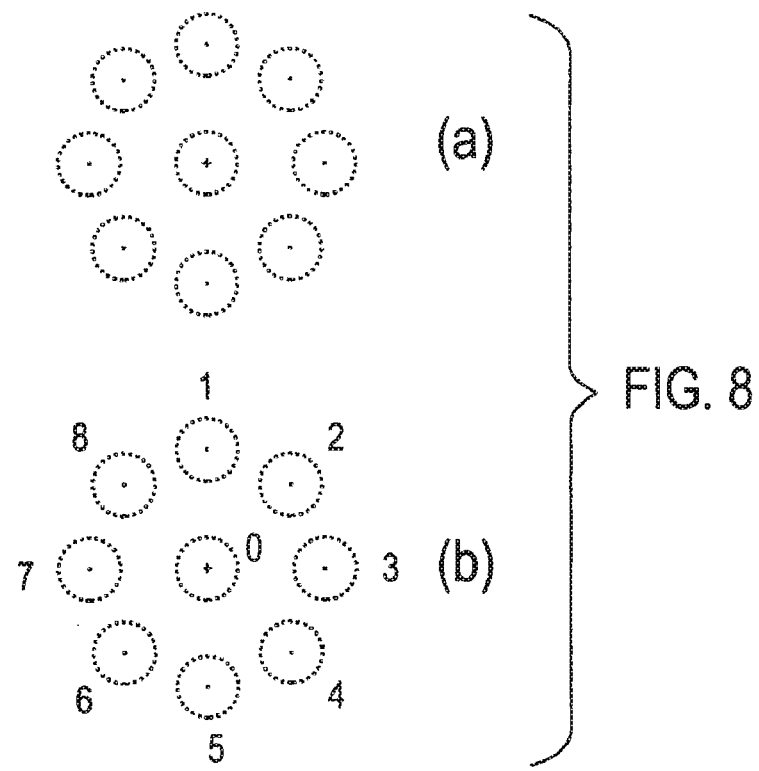

The gestures can be understood by way of examples. The gestures can be understood if it is imagined they are made from the centre of an imaginary compass. In an example eight gesture points are provided placed equally spaced around a start point. The gesture points may thus be considered to be at positions North, North East, East, South East, South, South West, West and North West of the start point, as shown in FIG. 8(a).

Further by way of example, the gesture points may be labelled with reference numerals such that the ventral point is 0, North is 1, North East is 2, East is 3, South East is 4, South is 5, South West is 6, West is 7 and North West is 8. This is shown in FIG. 8(b).

In the Figures, each gesture point is shown as surrounded by a circle. This circle is the preferred gesture tolerance area into which a gesture trace must pass in order for the associated gesture point to be acknowledged as being reached.

This 'point tracing' technique offers many combinations of gesture.

Figure 9:
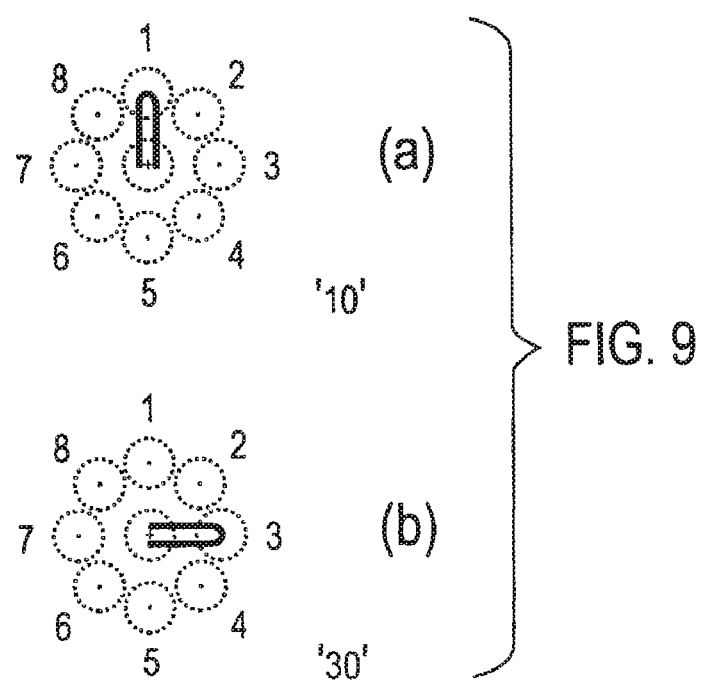

There are eight possible short line gestures (or so-called flick gestures) where the user moves the pen quickly out to one of the eight gesture points and back to the centre point. For example the user starts from the centre, flicks the pen up to the North gesture point, and flicks the pen immediately back to the centre, providing an up-down gesture. This is illustrated in FIG. 9(a). FIG. 9(b) shows a short line right-left gesture.

Each gesture can be defined by a sequence of numbers, using the annotations of FIG. 8(b), describing the order of the points that make up the gesture. In the above examples the number sequences are '10' for FIG. 9(a) and '30' for FIG. 9(b). The initial '0' need not be included in the number sequences as all gestures preferably include this starting point by default.

Figure 10:
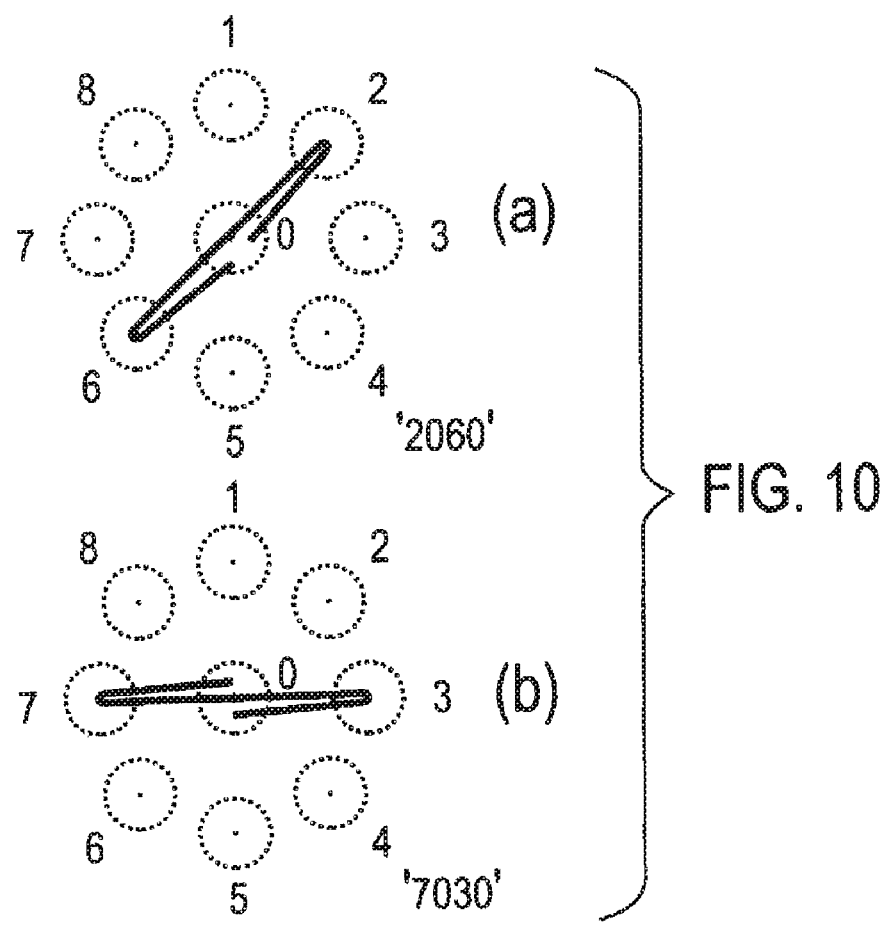

There are eight possible long line gestures. This is where the pen moves out to any gesture point, then back through the centre point to the opposite gesture point, finishing back in the centre. Examples are shown in FIGS. 10(a) and 10(b).

There are eight possible double short line gestures. This is where the same short line gesture is made twice in succession (the 'double flick'). Examples are '8080' and '5050'.

Figure 11:
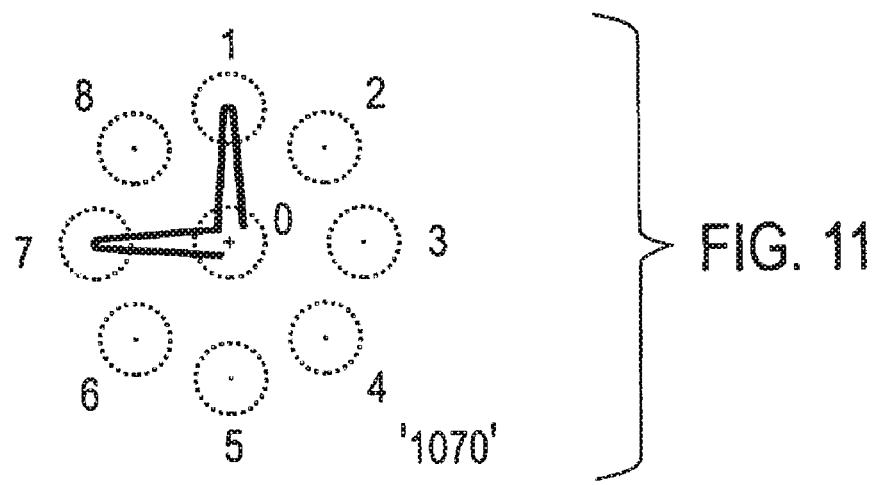

There are many line combination gestures which may be defined. One example is to form a right angle between the centre point and two other gesture points. In the example of FIG. 11, the pen is moved North, then back to the centre, then West, then back to the centre.

There are many possible shape gestures. This is where the pen is moved out to one of the eight gesture points, and then moved to one or more other gesture points before returning to the centre point.

Figure 12:
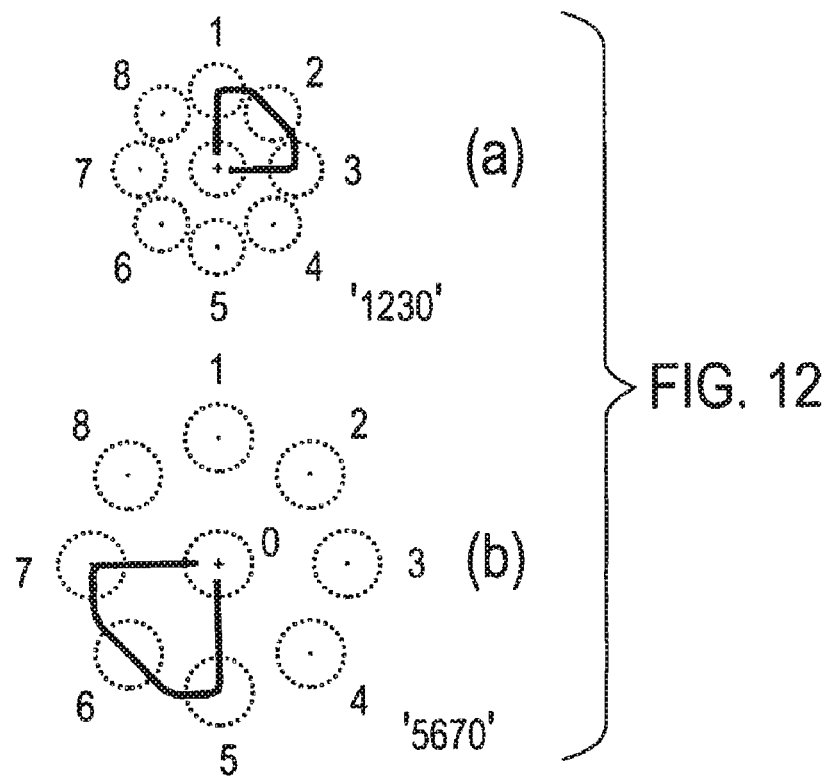

One example of a shape gesture is a quadrant gesture. There are many quadrant gestures. FIGS. 12(a) and 12(b) show two examples.

Figure 13:
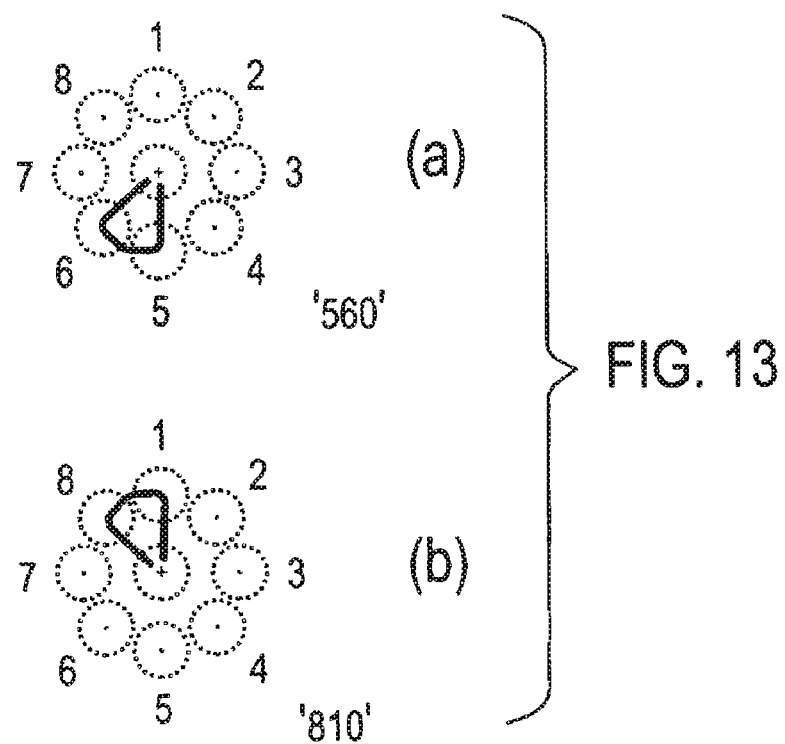

Another example of a shape gesture is a pie slice gesture. There are many possible slice gestures. Examples are shown in FIGS. 13(a) and 13(b).

Another example of a shape gesture is a semi-circular gesture. Again there are many semi-circular gestures. Examples are shown in FIGS. 14(a), 14(b), 14(c), and 14(d).

Another example of a shape gesture is a circular gesture. Circular gestures may be provided which require the user to trace through all the gesture points and back to the centre as illustrated in FIG. 15.

In practice gestures of this length and accuracy are difficult to trace and hence may not be provided for.

For all shape gestures it is possible to draw them in one of two ways. For example the first 'quadrant gesture' shown in FIG. 12(a) may be described by tracing through the points '1230' or '3210'. In all instances the program will preferably treat these as unique gestures.

It will be understood from the preceding discussion that there is an almost limitless number of gestures that can be defined. However, the range of gestures preferably needs to be kept fairly small so that the user can learn and remember them all.

As discussed previously, any gesture is made within the proximity layer and may be best performed whilst the users hand is resting on the surface of the board.

A fundamental principle that all gestures have in common is that they start at the centre point and end at the centre point. This rule in itself helps the program to avoid detecting random gestures out of the normal movements of the pen over the surface of the board.

Figure 16:
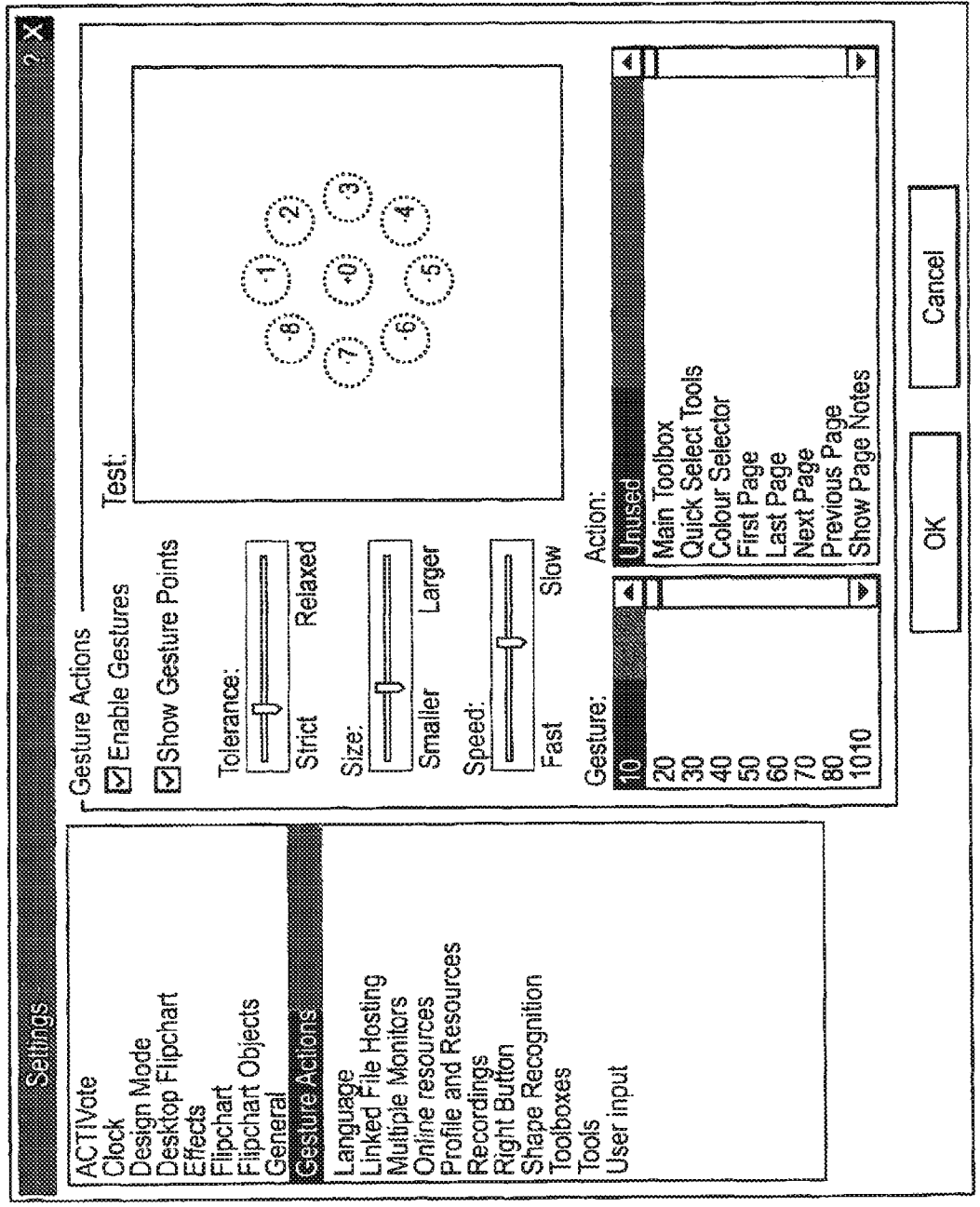
FIG. 16 illustrates a gesture setting application in an embodiment.

A new gesture actions settings panel will preferably be provided as shown in FIG. 16. A test area allows the user to practice gestures. It displays the eight possible gesture points surrounding a notional starting centre point. Each gesture point is shown with a tolerance circle whose radius is defined by a 'tolerance' slider. The bigger the tolerance circles, the less accurate the gesture can become.

The distance between the centre point and the gesture points is defined by a 'size' slider.

The 'gesture list box' contains a list of sixty four possible gestures that the gesture engine can recognise. The first gesture in the list is '10'. This is the 'up-down' gesture. To perform this gesture, the user moves the pen to the central cross, then quickly flicks the pen up to gesture point 1 and back to the starting point (point 0) without touching the board, ensuring that the target point is reached during the making of the gesture.

The 'action list' shows the currently selected action for the currently selected gesture. One of nearly 200 actions can be associated to each of the 64 gestures. The list of actions may be taken selectively from the standard functions and page and object actions of any application being used.

The starting point for a gesture can actually be anywhere on the interactive surface. The settings test centre point is only provided as a guiding start point.

The speed at which the gesture must be made can be altered with the 'speed' slider, together with the size and tolerance of the gesture.

Figure 17:
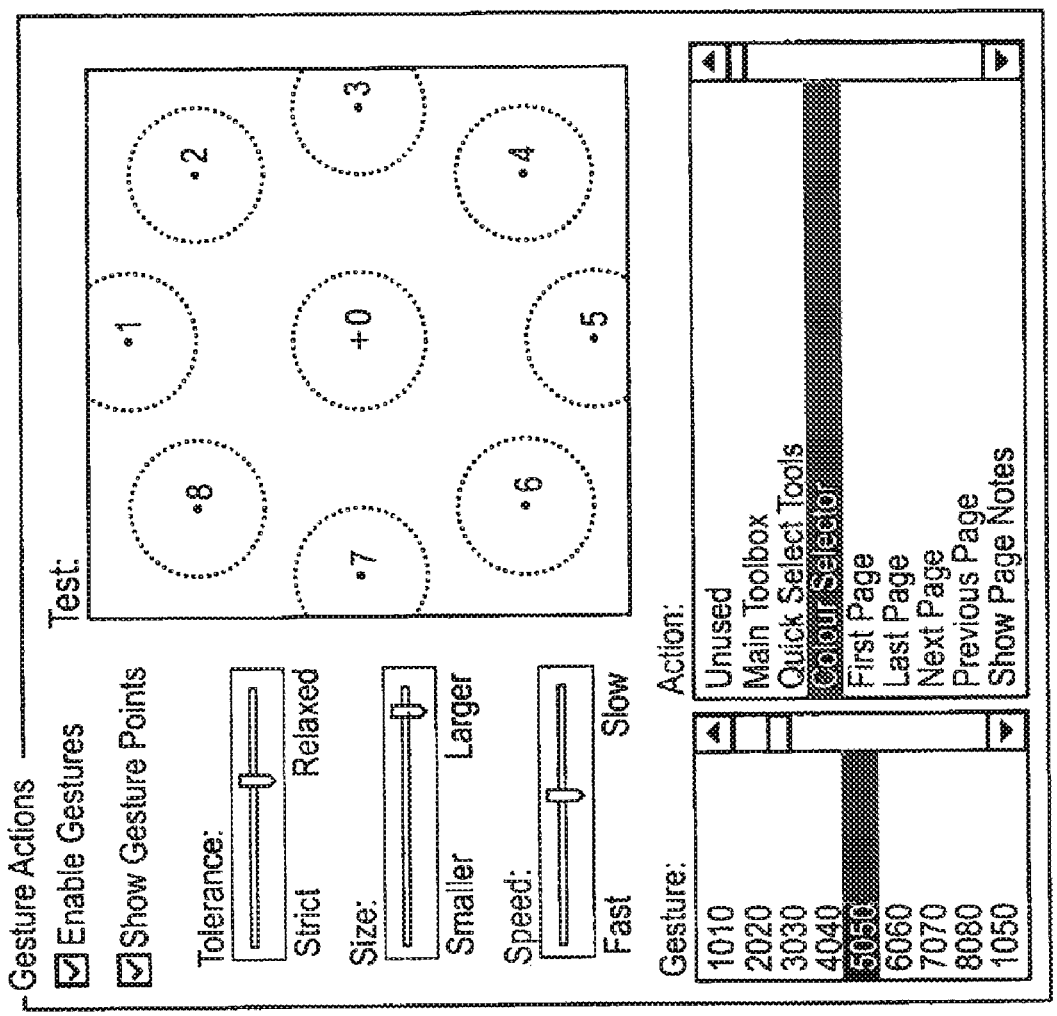
FIG. 17 illustrates a gesture setting application in an embodiment.

In the example of FIG. 17 it can be seen that the user has increased the tolerance circles and made the required gesture size much larger. It can also be seen that the double short line gesture 'down-up-down-up' (5050) has been set to show the Colour Selector panel as illustrated further in FIG. 17.

When gesture actions are enabled they will preferably only operate when performed over the surface of the interactive surface, rather than on the surface. Preferably the gesture actions are enabled only when performed over an active portion of the interactive surface associated with an application.

For the example of a flipchart application, the active portion of the interactive surface may be the portion on which the work surface of the flip chart is displayed. Any one of the gestures can be made anywhere over the surface of the flipchart at any time in order to invoke the associated action. Alternatively the gesture actions may be enabled when performed anywhere over the entire surface of the interactive surface, irrespective of any running application. In such circumstances the gesture may enable an action associated with the operating system.

If a 'Show Gesture Points' setting is enabled, in use in an application the user may see the gesture target points drawn as light grey pixels around the pen position on the displayed image on the interactive surface.

Whilst the invention and the various embodiments thereof is ideally suited to passive electromagnetic positioning technology as described herein, it may also be used with active pointer devices. The invention and its embodiments are also not limited to electromagnetic interactive technology. Optical technology may also be used.

It should be noted that although the description herein is presented in the context of an interactive display system incorporating a whiteboard assembly arrangement, the invention is not limited to such. The invention generally applies to interactive input/output devices, which may include, for example, graphics tablets such as may be used in interactive display systems. The invention may generally be used with any type of interactive display adapted to interact with a pointing device.

The invention claimed is:

1. An interactive system comprising an interactive surface for detecting the position of at least one pointing device positioned, in use, at the interactive surface, the system being adapted to detect one of a plurality of predetermined sequences of movements of the pointing device, in dependence on each sequence of movements beginning and ending at the same point, and the system being further adapted to enable an operation responsive to said detection.

2. An interactive system according to claim 1 wherein the predetermined sequence of movements correspond to a user gesture.

3. An interactive system according to claim 1 wherein the predetermined sequence of movements is detected between a set of points.

4. An interactive system according to claim 3 wherein each point is an area within which presence of the pointing device can be detected.

5. An interactive system according to claim 1 wherein the operation is enabled responsive further to detection of the pointing device in a region above the interactive surface, the pointing device not being in contact with the interactive surface.

6. An interactive system according to claim 1 wherein the system is adapted such that the predefined operation is an action within an application running on the interactive surface.

7. An interactive system according to claim 1 wherein the system is adapted such that the starting point of the sequence of movements is a notional central point for the gesture.

8. An interactive system according to claim 1 wherein the system is adapted such that the starting point of the sequence of movements is anywhere on the interactive surface.

9. An interactive system according to claim 1 wherein the system is adapted such that the operation is enabled only when performed over an active portion of the interactive display associated with an application.

10. An interactive system according to claim 1 wherein the system is adapted such that the predefined operation is an action associated with the operating system.

11. An interactive system according to claim 1 wherein the system is adapted such that target points are displayed around the pointing device position on the displayed image on the interactive surface.

12. A method in an interactive system, the system comprising an interactive surface adapted for receiving inputs from at least one pointing device positioned, in use, at the interactive surface, the method comprising the steps of detecting one of a plurality of predetermined sequences of movements of the pointing device, in dependence on each sequence of movements beginning and ending at the same point, and responsive to said detection enabling an operation.

13. The method according to claim 12 wherein the predetermined sequence of movements correspond to a user gesture.

14. The method according to claim 12 wherein the predetermined sequence of movements is detected between a set of points.

15. The method according to claim 12 comprising the step of enabling the operation responsive further to detection of the pointing device in a region above the interactive surface and not in contact with the interactive surface.

16. The method according to claim 14 wherein the points comprise a start point and at least one further point.

17. The method according to claim 12 wherein the predetermined sequence of movements is between any number of points, any number of times.

18. The method according to claim 12 wherein the predetermined sequence of movement defines a shape.

19. The method according to claim 12 wherein the operation is enabled responsive to the speed of the predetermined sequence of movement.

20. The method according to claim 12 further comprising displaying the points on the surface for displaying an image.

* * * * *